(12) United States Patent
Takano et al.

(10) Patent No.: US 8,267,454 B2
(45) Date of Patent: Sep. 18, 2012

(54) PICK-UP STYLE UTILITY VEHICLE WITH EXPANDABLE CARGO BED

(75) Inventors: Kiyohito Takano, Kobe (JP); Satoshi Takaya, Akashi (JP); Kiyoaki Maeda, Kobe (JP); Kousei Hokari, Miki (JP); Geoffrey Ewing, Lincoln, NE (US); Junhei Asahi, Akashi (JP); Naoki Tamai, Akashi (JP); Kenji Oda, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 195 days.

(21) Appl. No.: 12/647,862

(22) Filed: Dec. 28, 2009

(65) Prior Publication Data

US 2011/0156419 A1   Jun. 30, 2011

(51) Int. Cl.
*B60R 9/06*   (2006.01)

(52) U.S. Cl. .............. 296/26.02; 296/26.11; 296/26.06
(58) Field of Classification Search ............. 296/26.06, 296/26.11, 183.1
See application file for complete search history.

(56) References Cited

U.S. PATENT DOCUMENTS

| | | | |
|---|---|---|---|
| 6,474,714 B1 * | 11/2002 | Stettner | 296/26.08 |
| 6,905,159 B1 | 6/2005 | Saito et al. | |
| 6,994,388 B2 | 2/2006 | Saito et al. | |
| 7,249,798 B2 | 7/2007 | Saito et al. | |

* cited by examiner

*Primary Examiner* — Joseph Pape
(74) *Attorney, Agent, or Firm* — Wenderoth, Lind & Ponack, LLP

(57) ABSTRACT

A pick-up style utility vehicle with an expandable cargo bed, including a stationary cargo bed part serving as a bottom face and a side face of the cargo bed, a movable cargo bed part serving as the bottom face and the side face of the expanded cargo bed, and a cargo bed support mechanism for supporting the movable cargo bed part at a normal position and an expansion position set on the rear side of the normal position.

3 Claims, 37 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle having an expandable cargo bed.

2. Description of the Related Art

In general, a pick-up style utility vehicle is provided with a relatively large cargo bed in a rear section of a seat in comparison to a handlebar style utility vehicle belonging to an all terrain vehicle. Therefore, the pick-up style utility vehicle is used in wider practical fields of uses such as transport in golf links, maintenance of the golf links, hunting and conveyance of wood materials in comparison to the handlebar style utility vehicle.

The applicant previously filed applications for the inventions relating to a pick-up style utility vehicle with an expandable cargo bed, and those applications were registered. For example, the inventions include U.S. Pat. No. 6,905,159, U.S. Pat. No. 6,994,388, and U.S. Pat. No. 7,249,798.

FIG. 42 shows a pick-up style utility vehicle 901 as shown in the patent literatures described above. The pick-up style utility vehicle 901 is provided with a front seat 902, a rear seat 903, and a cargo bed CN. The cargo bed CN includes a stationary bottom plate 907 and a plate portion 904 arranged on the stationary bottom plate 907. The pick-up style utility vehicle 901 is switchable between a normal state in which the vehicle is used as a four-seater vehicle and an expanded state in which the vehicle is used as a two-seater vehicle with an expanded cargo bed. A screen 905 is arranged on the stationary bottom plate 907 between the plate portion 904 and the rear seat 903.

FIG. 43 is a side view showing the pick-up style utility vehicle 901 in the normal state. In the normal state, passengers can sit in both the front seat 902 and the rear seat 903. The rear seat 903 is supported pivotably on a horizontal shaft 935 provided in a front end of the rear seat 903. FIG. 43 shows the rear seat 903 at a use position P1 and the cargo bed CN in the normal state. The "rear seat 903 at the use position P1" indicates the seat 903 placed on the stationary bottom plate 907.

FIG. 44 is a side view showing the pick-up style utility vehicle 901 in the expanded state. In the expanded state, the rear seat 903 is at a shunting position P2. The rear seat 903 at the shunting position P2 stands up on the front side of the stationary bottom plate 907. Therefore, the passengers cannot sit in the rear seat 903 at the shunting position P2. Meanwhile, since the rear seat 903 is shunted to the front side of the stationary bottom plate 907, the entire face of the stationary bottom plate 907 is cleared. Therefore, a cargo bed CE in the expanded state is extended more than the cargo bed CN in the normal state.

The normal state is changed to the expanded state as follows. Firstly, the rear seat 903 pivotable on the horizontal shaft 935 is folded down forward from the use position P1 to the shunting position P2. Then, in accordance with the positional change of the rear seat 903, a position of the screen 905 is changed to the front side. As a result, a front part of the stationary bottom plate 907 is also cleared. Therefore, the entire face of the stationary bottom plate 907 is usable as a bottom face of the cargo bed. Expansion side plates 943 accommodated in the plate portion 904 are developed to the front side. In such a way, the cargo bed CE in the expanded state is formed.

FIG. 45 shows an example of the screen 905. The screen 905 is formed of a steel frame and wire mesh. Therefore, the screen 905 is a heavy member. The screen 905 is supported on a chassis by inserting protruding portions 905a, 905a of the screen 905 into attachment holes arranged in both ends of the chassis in the right and left direction. That is, there is a need for once lifting the screen 905 up in order to move the screen 905. Therefore, the positional change of the screen 905 requires two persons and is not easily performed by one person.

SUMMARY OF THE INVENTION

The present invention is achieved in consideration with the problems above, and an object of the invention is to eliminate the need for transport of a screen in accordance with a change of a cargo bed.

A first aspect of the invention is a pick-up style utility vehicle with an expandable cargo bed including a stationary cargo bed part serving as a bottom face and a side face of the cargo bed, a movable cargo bed part serving as the bottom face and the side face of the expanded cargo bed, and a cargo bed support mechanism for supporting the movable cargo bed part at a normal position and at an expansion position set on the rear side of the normal position.

According to the first aspect, when the cargo bed is expanded, the cargo bed is not abutted with a screen. Therefore, passengers are not required to transport the screen when the cargo bed is changed.

Configurations (1a) to (1d) may preferably be adapted for the pick-up style utility vehicle of the first aspect of the invention.

In configuration (1a), the movable cargo bed part at the normal position is positioned immediately above the stationary cargo bed part, the movable cargo bed part at the expansion position is positioned immediately behind the stationary cargo bed part, and the cargo bed support mechanism is a first cargo bed linkage mechanism formed by a linkage mechanism.

In configuration (1b), the movable cargo bed part at the normal position and the expansion position is arranged on the upper side or the lower side of the stationary cargo bed part, and the cargo bed support mechanism is a first cargo bed slide mechanism for supporting the movable cargo bed part slidably in the back and forth direction.

In configuration (1c), the movable cargo bed part at the normal position and the expansion position is arranged on the inner side of the stationary cargo bed part in the right and left direction, and the cargo bed support mechanism is a second cargo bed slide mechanism for supporting the movable cargo bed part slidably in the back and forth direction.

In configuration (1d), the movable cargo bed part is provided on the upper side of a screen for closing the front side of the stationary cargo bed part, the cargo bed support mechanism is a cargo bed rotary support mechanism for supporting the movable cargo bed part pivotably on a horizontal shaft in the right and left direction relative to an upper end of the screen, the movable cargo bed part at the normal position is positioned immediately above the screen, and the movable cargo bed part at the expansion position is positioned on the rear side of the screen.

A second aspect of the invention is a pick-up style utility vehicle with an expandable cargo bed including a stationary bottom plate serving as a bottom face of the cargo bed, a stationary side plate serving as a side face of the cargo bed, a movable bottom plate serving as the bottom face of the expanded cargo bed, a movable side plate serving as the side face of the expanded cargo bed, a bottom plate support mechanism for supporting the movable bottom plate at a first normal position and at a first expansion position set on the rear side of the first normal position, and a side plate support mechanism for supporting the movable side plate at a second normal position and at a second expansion position set on the rear side of the second normal position.

Configurations (2a) to (2g) may preferably be adapted for the pick-up style utility vehicle of the second aspect of the invention.

In configuration (2a), the bottom plate support mechanism is a first bottom plate rotary support mechanism for supporting the movable bottom plate pivotably on a horizontal shaft in the right and left direction relative to a rear end of the stationary bottom plate.

In configuration (2b), the side plate support mechanism is a first side plate rotary support mechanism for supporting the movable side plate pivotably on a horizontal shaft in the right and left direction relative to a rear upper end of the stationary side plate.

In configuration (2c), the side plate support mechanism is formed by the first bottom plate rotary support mechanism, and a side plate opening and closing support mechanism for supporting the movable side plate openably relative to the movable bottom plate.

In configuration (2d), the bottom plate support mechanism is a bottom plate slide mechanism for supporting the movable bottom plate slidably in the back and forth direction relative to the stationary bottom plate.

In configuration (2e), the side plate support mechanism is a first side plate linkage mechanism formed by a linkage mechanism.

In configuration (2f), the side plate support mechanism is a second side plate rotary support mechanism for supporting the movable side plate pivotably on a horizontal shaft in the back and forth direction relative to an upper end of the stationary side plate.

In configuration (2g), the side plate support mechanism is a side plate rotary support mechanism for supporting the movable side plate pivotably on a vertical shaft relative to the movable bottom plate.

DETAILED DESCRIPTION OF THE PREFERRED EMBODIMENTS

First Embodiment

A pick-up style utility vehicle 1 has a cargo bed which is expandable rearward. With regard to the cargo bed, a state before expansion is a normal state (FIGS. 1 and 3), and a state after expansion is an expanded state (FIGS. 2 and 4). Hereinafter, a configuration of this pick-up style utility vehicle will be described in detail based on the drawings.

Figure 1:
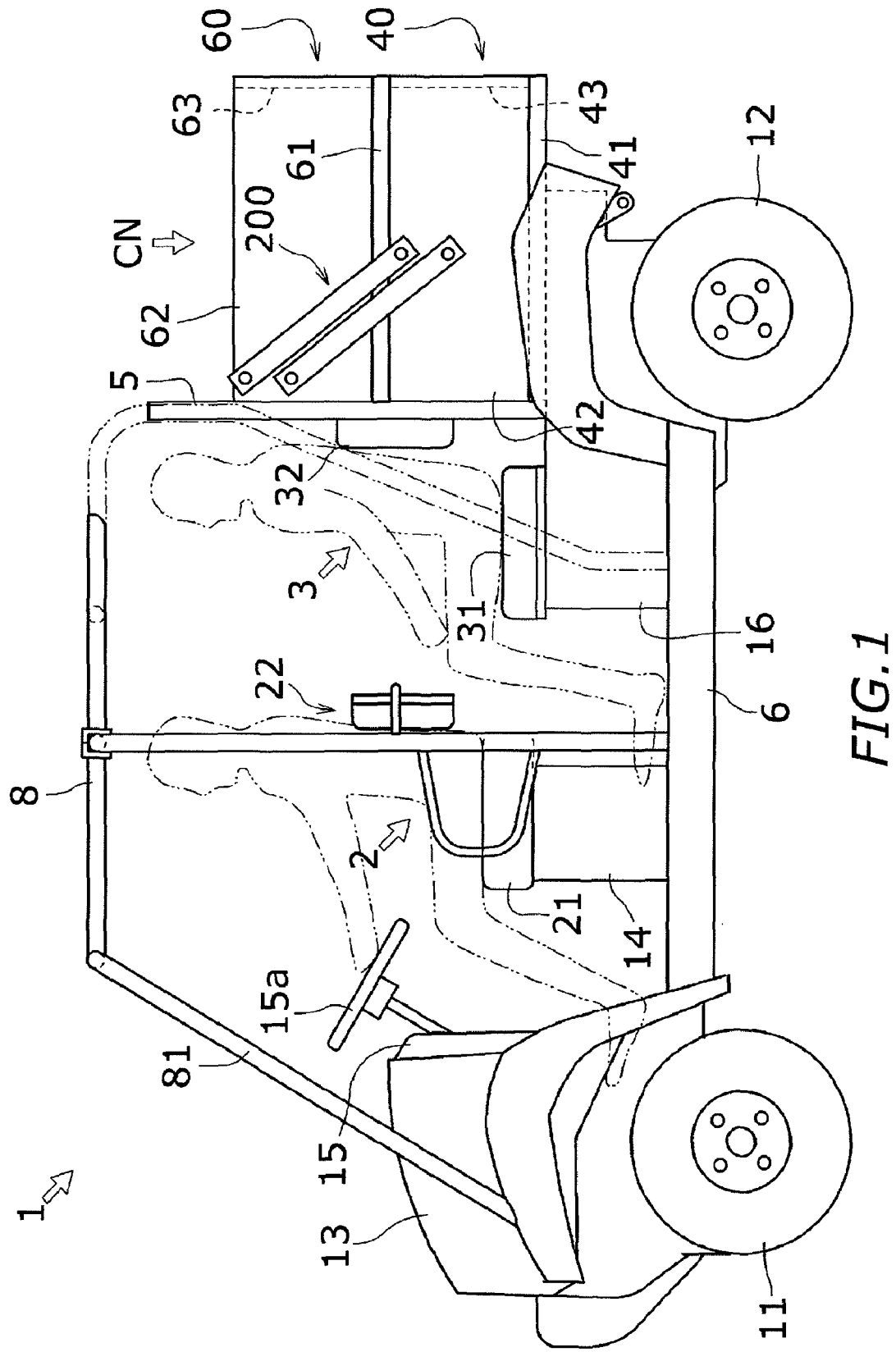
FIG. 1 is a side view showing a pick-up style utility vehicle in a normal state (a first embodiment)
Figure 2:
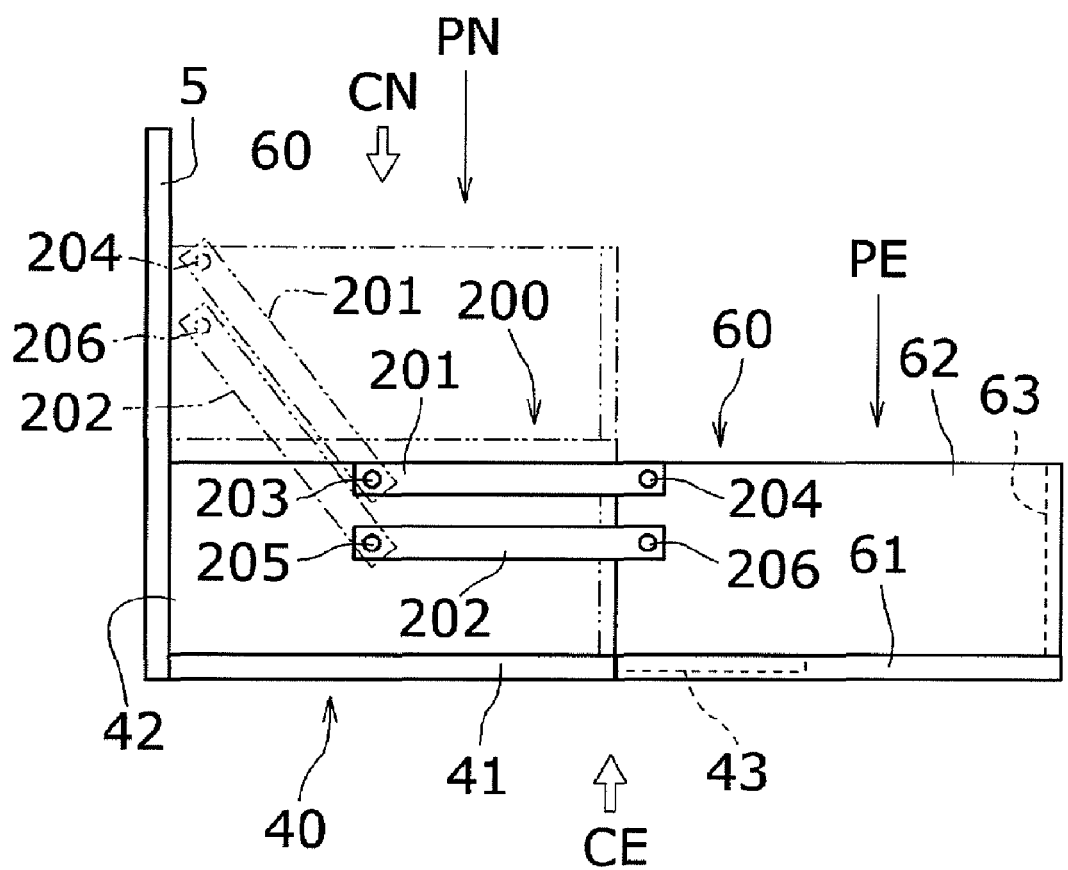
FIG. 2 is a side view showing a cargo bed in an expanded state (the first embodiment)

FIG. 1 is a side view showing the pick-up style utility vehicle 1 in the normal state. The pick-up style utility vehicle 1 includes a chassis 6 provided with a pair of right and left front wheels 11 and a pair of right and left rear wheels 12. A hood 13, a front support stand 14, and a rear support stand 16 are arranged on the chassis 6 in this order from the front side to the rear side. A dashboard (an operation portion) 15 provided with a steering wheel 15a and the like is arranged in a rear part of the hood 13. A front seat 2 is arranged on the upper side of the front support stand 14. A rear seat 3, a screen 5, a stationary cargo bed part 40, and a movable cargo bed part 60 are arranged on the upper side of the rear support stand 16. A cabin frame 8 is arranged so as to surround the dashboard 15, the front seat 2, and the rear seat 3. The cabin frame 8 is fixed to the chassis 6. A cabin is formed in the interior surrounded by the chassis 6 and the cabin frame 8. It should be noted that description of positional relationships (such as a front end and the upper side) in a first embodiment is based on posture in the normal state (FIG. 1).

The front seat 2 and the rear seat 3 are seats formed in a bench shape elongated in the right and left direction. In the present embodiment, two passengers can sit side by side in both the front seat 2 and the rear seat 3.

In FIG. 1, the front seat 2 is provided with a front main seat 21 and a front backrest 22. The front main seat 21 is fixed to the front support stand 14. The front backrest 22 is fixed to the cabin frame 8.

In FIG. 1, the rear seat 3 is provided with a rear main seat 31, and a rear backrest 32. The rear main seat 31 is fixed to the rear support stand 16. The rear backrest 32 is fixed to the screen 5.

In FIG. 1, a cargo bed CN in the normal state is formed. In the normal state and the expanded state, the cargo bed is formed by the stationary cargo bed part 40 and the movable cargo bed part 60. A difference between the normal state and the expanded state is a positional relationship between the stationary cargo bed part 40 and the movable cargo bed part 60. The cargo bed CN in the normal state is formed by the stationary cargo bed part 40 and the movable cargo bed part 60 arranged one above the other.

The stationary cargo bed part 40 is provided with a bottom plate 41, two side plates 42, 42, and a rear plate 43. The bottom plate 41 is fixed to the rear support stand 16. The bottom plate 41 serves as a bottom face of the stationary cargo bed part 40. The two side plates 42, 42 serve as right and left side faces of the stationary cargo bed part 40. The rear plate 43 serves as a rear face of the stationary cargo bed part 40. The rear plate 43 is provided pivotably on a horizontal shaft on a rear end of the bottom plate 41. Therefore, the rear face of the stationary cargo bed part 40 can be exposed by the rear plate 43. The screen 5 serves as a front surface of the stationary cargo bed part 40.

The movable cargo bed part 60 is provided with a bottom plate 61, two side plates 62, 62, and a rear plate 63. The bottom plate 61 serves as a bottom face of the movable cargo bed part 60. The two side plates 62, 62 serve as right and left side faces of the movable cargo bed part 60. The rear plate 63 serves as a rear face of the movable cargo bed part 60. The rear plate 63 is provided pivotably on a horizontal shaft on a rear end of the bottom plate 61. Therefore, the rear face of the movable cargo bed part 60 can be exposed by the rear plate 63. The screen 5 serves as a front surface of the movable cargo bed part 60.

In FIG. 1, the pick-up style utility vehicle 1 is provided with a first cargo bed linkage mechanism 200 serving as a cargo bed support mechanism for guiding movement of the movable cargo bed part 60. The first cargo bed linkage mechanism 200 is formed by a linkage mechanism.

FIG. 2 is a side view showing a cargo bed CE in the expanded state. The first cargo bed linkage mechanism 200 is formed by a parallel link. The first cargo bed linkage mechanism 200 is provided with an upper link 201, a lower link 202, a first upper shaft 203, a second upper shaft 204, a first lower shaft 205, and a second lower shaft 206. The first upper shaft 203 and the second upper shaft 204 are provided in both ends of the upper link 201. The first lower shaft 205 and the second lower shaft 206 are provided in both ends of the lower link 202. The first upper shaft 203 and the first lower shaft 205 are provided in the side plate 42 of the stationary cargo bed part 40. The second upper shaft 204 and the second lower shaft 206 are provided in the side plate 62 of the movable cargo bed part 60.

The first cargo bed linkage mechanism 200 guides the movement of the movable cargo bed part 60 between a normal position PN and an expansion position PE. The movable cargo bed part 60 at the normal position PN is immediately above the stationary cargo bed part 40. The movable cargo bed part 60 at the expansion position PE is immediately behind the stationary cargo bed part 40.

Figure 3:
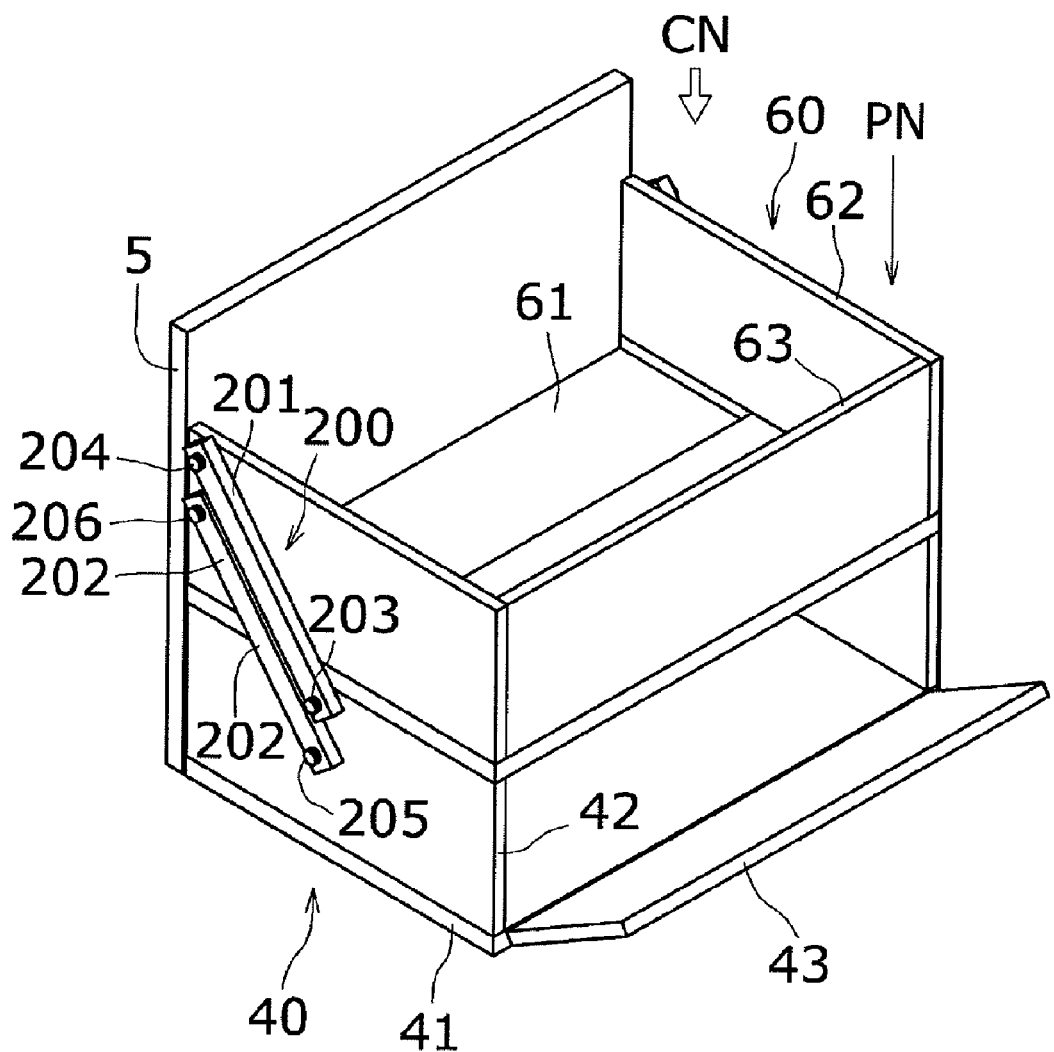
FIG. 3 is a perspective view showing the cargo bed in the normal state (the first embodiment)
Figure 4:
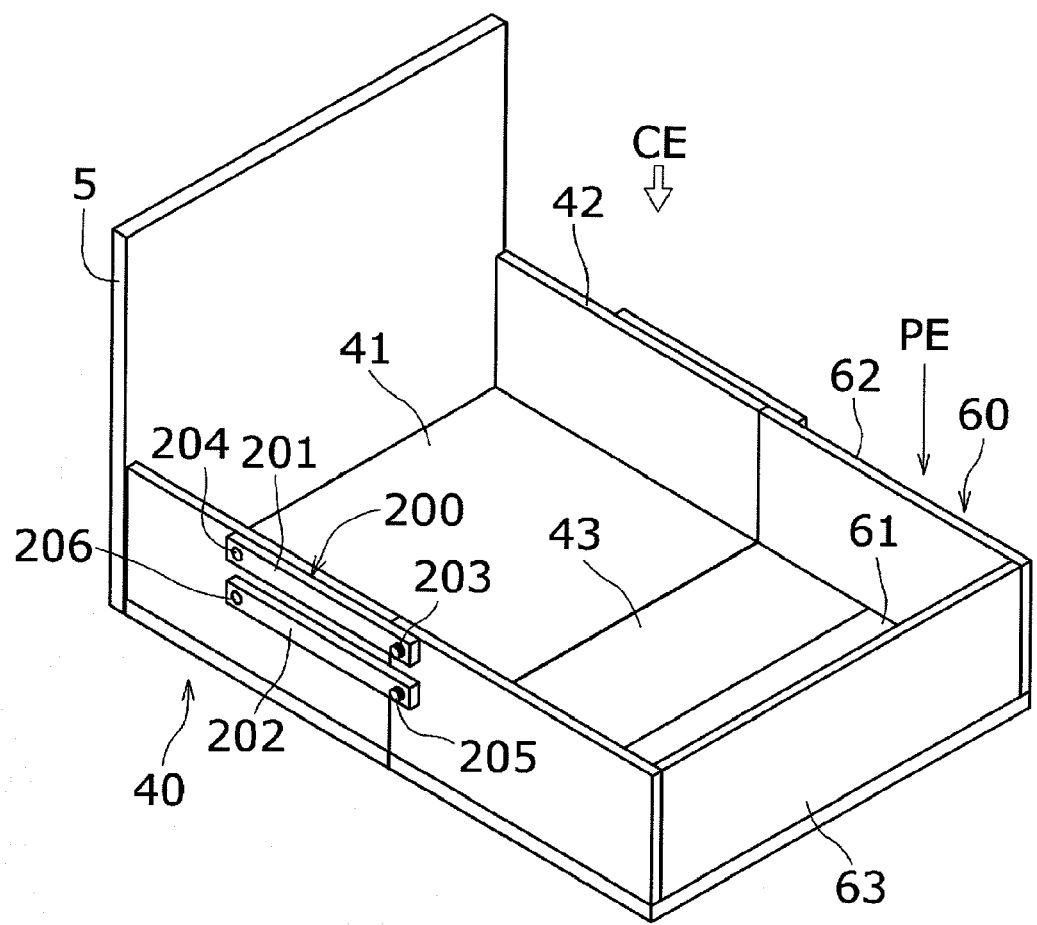
FIG. 4 is a perspective view showing the cargo bed in the expanded state (the first embodiment)

FIG. 3 is a perspective view showing the cargo bed CN in the normal state. The movable cargo bed part 60 at the normal position PN is supported on the stationary cargo bed part 40. Therefore, an upper face of the stationary cargo bed part 40 is closed by the movable cargo bed part 60. However, when the rear plate 43 of the stationary cargo bed part 40 is opened, the stationary cargo bed part 40 can also be utilized as the cargo bed. That is, in the normal state, the stationary cargo bed part 40 and the movable cargo bed part 60 serve as cargo beds which are independent from each other.

FIG. 4 is a perspective view showing the cargo bed CE in the expanded state. The passengers push the movable cargo bed part 60 rearward while grabbing the movable cargo bed part 60, so that the movable cargo bed part 60 can be moved from the normal position PN to the expansion position PE. The movable cargo bed part 60 at the expansion position PE is supported by the first cargo bed linkage mechanism 200 and a rear end face of the stationary cargo bed part 40. In FIG. 4, the bottom plate 41 of the stationary cargo bed part 40 and the bottom plate 61 of the movable cargo bed part 60 form an identical plane (an identical bottom face). Therefore, when the rear plate 43 of the stationary cargo bed part 40 is opened, the stationary cargo bed part 40 and the movable cargo bed part 60 can be utilized as an integral cargo bed.

The cargo bed is expandable rearward in the first embodiment. Therefore, when the cargo bed is changed between the normal state and the expanded state, the cargo bed parts 40 and 60 are not abutted with the screen 5. Therefore, the passengers are not required to transport the screen 5 at the time of changing the cargo bed.

Second Embodiment

Figure 5:
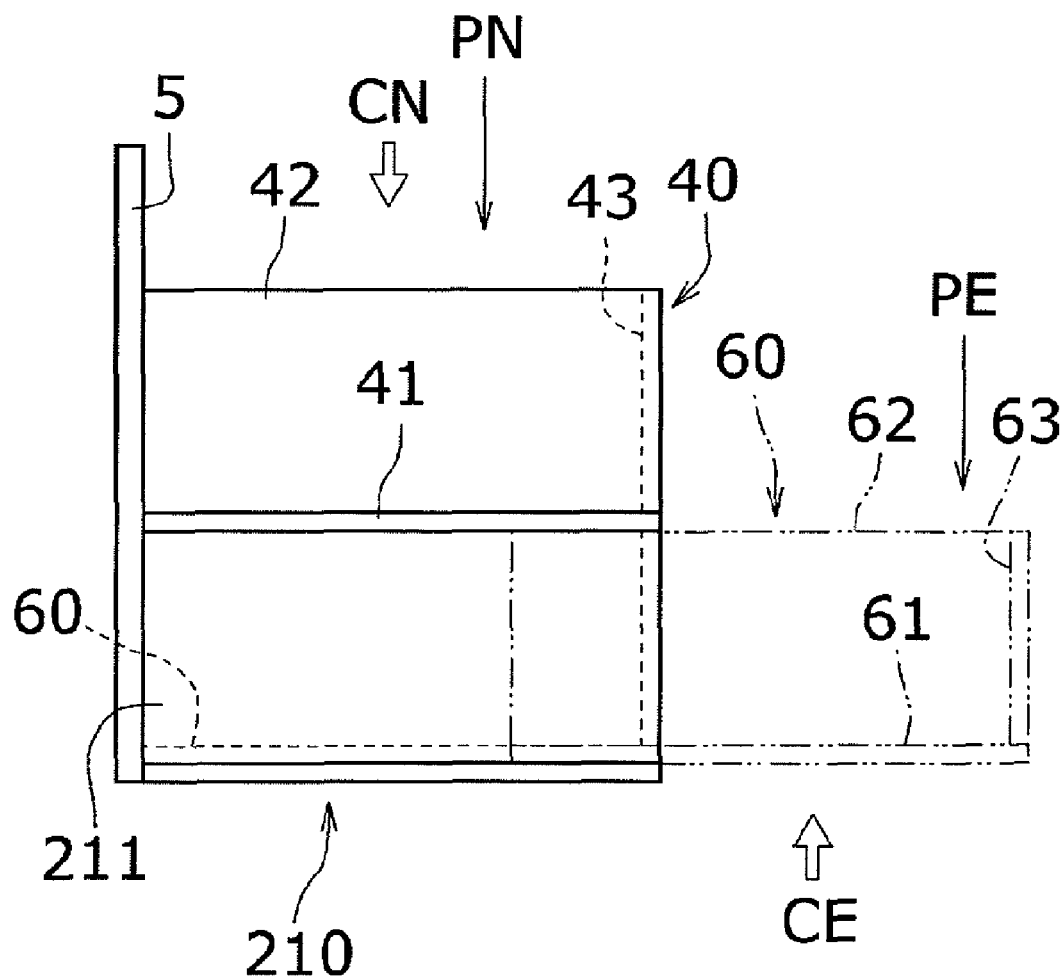
FIG. 5 is a side view showing a rear part of the pick-up style utility vehicle in the normal state (a second embodiment)
Figure 6:
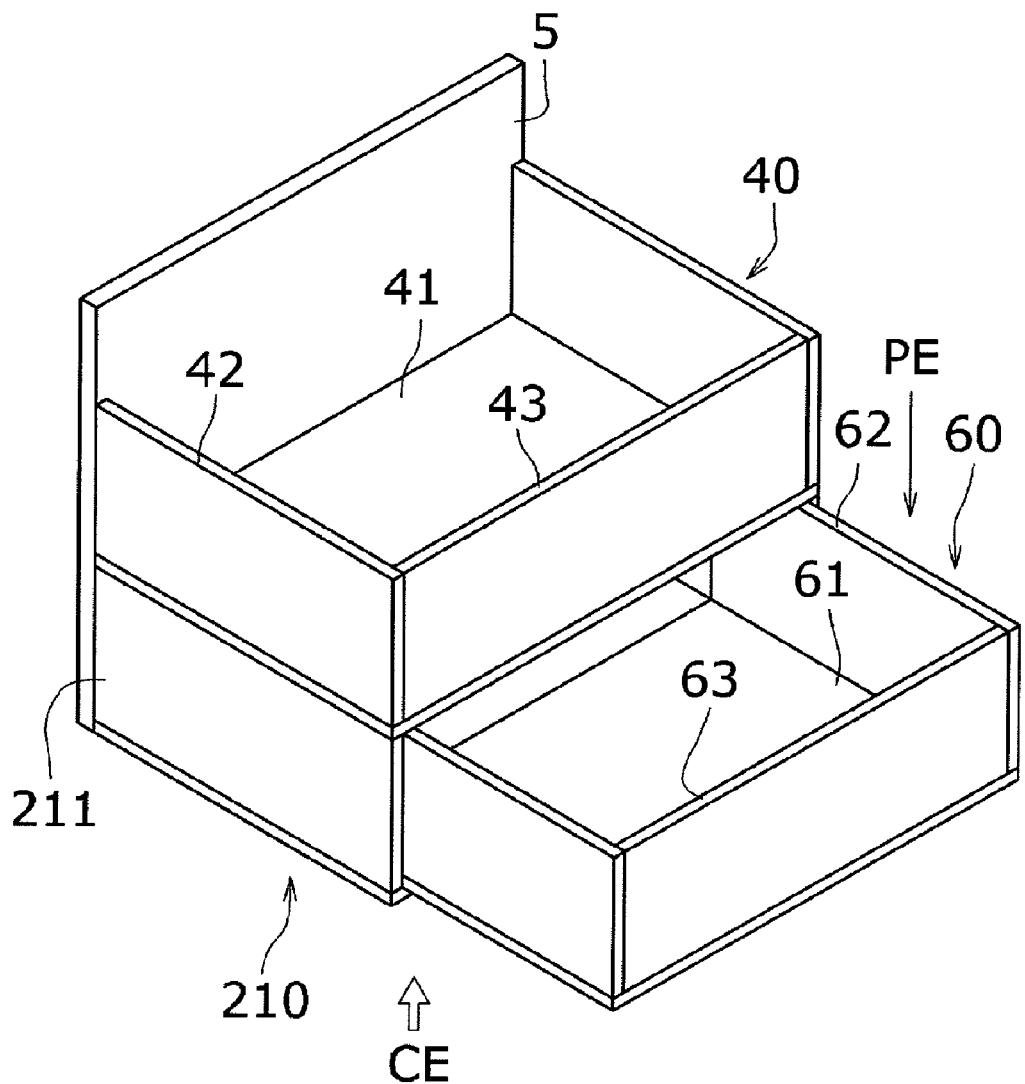
FIG. 6 is a perspective view showing the cargo bed (the second embodiment)

FIGS. 5 and 6 show the pick-up style utility vehicle 1 in a second embodiment. The second embodiment is the same as the first embodiment except differences in a positional relationship between the stationary cargo bed part 40 and the movable cargo bed part 60, and the cargo bed support mechanism. In the second embodiment, parts which are common to the first embodiment will be given the same reference numerals. It should be noted that description of positional relationships in the second embodiment is based on the posture in the normal state (FIG. 5).

FIG. 5 is a side view showing a rear part of the pick-up style utility vehicle 1 in the normal state. The movable cargo bed part 60 is arranged on the rear support stand 16, and the stationary cargo bed part 40 is arranged on the upper side of the movable cargo bed part 60. The movable cargo bed part 60 at the normal position PN is shown by a broken line. The movable cargo bed part 60 at the expansion position PE is shown by a double chain line.

FIG. 6 is a perspective view showing the cargo bed. In the second embodiment, the cargo bed support mechanism is formed by a slide mechanism 210. The first cargo bed slide mechanism 210 supports the movable cargo bed part 60 slidably in the back and forth direction.

As shown in FIG. 6, the first cargo bed slide mechanism 210 is formed by a frame member 211. The frame member 211 has the same shape as the movable cargo bed part 60 so as to store the movable cargo bed part 60. The frame member 211 is fixed onto the rear support stand 16. The stationary cargo bed part 40 is fixed onto the frame member 211.

The passengers pull the movable cargo bed part 60 rearward while grabbing the movable cargo bed part 60, so that the movable cargo bed part 60 can be moved from the normal position PN to the expansion position PE. The movable cargo bed part 60 is supported on the frame member 211 at the normal position PN and the expansion position PE.

Third Embodiment

Figure 7:
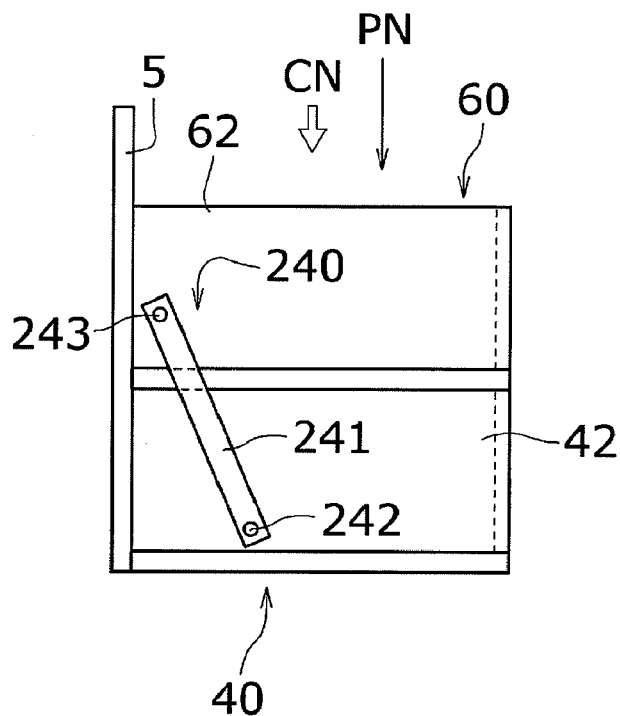
FIG. 7 is a side view showing the rear part of the pick-up style utility vehicle in the normal state (a third embodiment)
Figure 8:
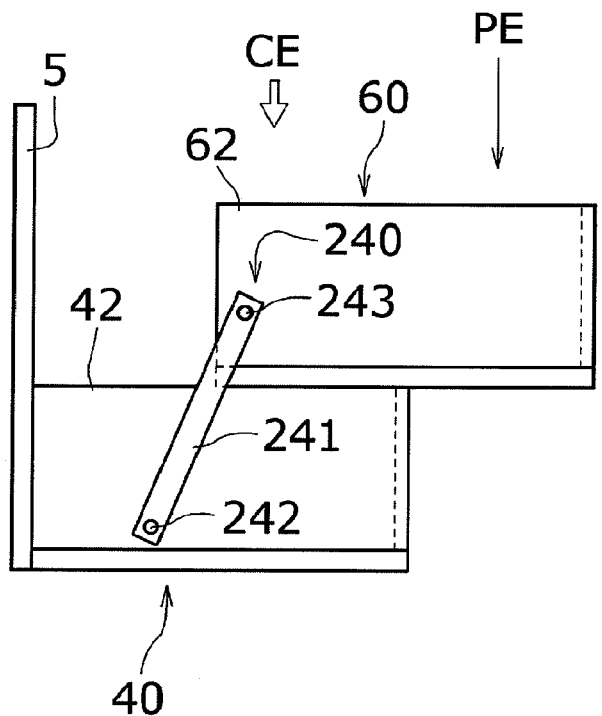
FIG. 8 is a side view showing the rear part of the pick-up style utility vehicle in the expanded state (the third embodiment)

FIGS. 7 and 8 show the pick-up style utility vehicle 1 in a third embodiment. The third embodiment is the same as the first embodiment except a difference in the cargo bed support mechanism. In the third embodiment, parts which are common to the first embodiment will be given the same reference numerals. It should be noted that description of positional relationships in the third embodiment is based on the posture in the normal state (FIG. 7).

FIG. 7 is a side view showing the rear part of the pick-up style utility vehicle 1 in the normal state. In FIG. 7, the cargo bed CN in the normal state is formed. The stationary cargo bed part 40 is arranged on the rear support stand 16, and the movable cargo bed part 60 is arranged on the upper side of the stationary cargo bed part 40.

In the third embodiment, the cargo bed support mechanism is formed by a second cargo bed linkage mechanism 240. The second cargo bed linkage mechanism 240 can support the movable cargo bed part 60 at the normal position PN and the expansion position PE. The second cargo bed linkage mechanism 240 is provided with a link 241, a lower shaft 242, and an upper shaft 243. The lower shaft 242 and the upper shaft 243 are respectively provided in both ends of the link 241. The lower shaft 242 is provided in the side plate 42 of the stationary cargo bed part 40, and the upper shaft 243 is provided in the side plate 62 of the movable cargo bed part 60.

FIG. 8 is a side view showing the rear part of the pick-up style utility vehicle 1 in the expanded state. In FIG. 8, the cargo bed CE in the expanded state is formed. The passengers push the movable cargo bed part 60 rearward while grabbing the movable cargo bed part 60, so that the movable cargo bed part 60 can be moved from the normal position PN to the expansion position PE. The movable cargo bed part 60 is supported on the stationary cargo bed part 40 at the normal position PN and the expansion position PE.

Fourth Embodiment

Figure 9:
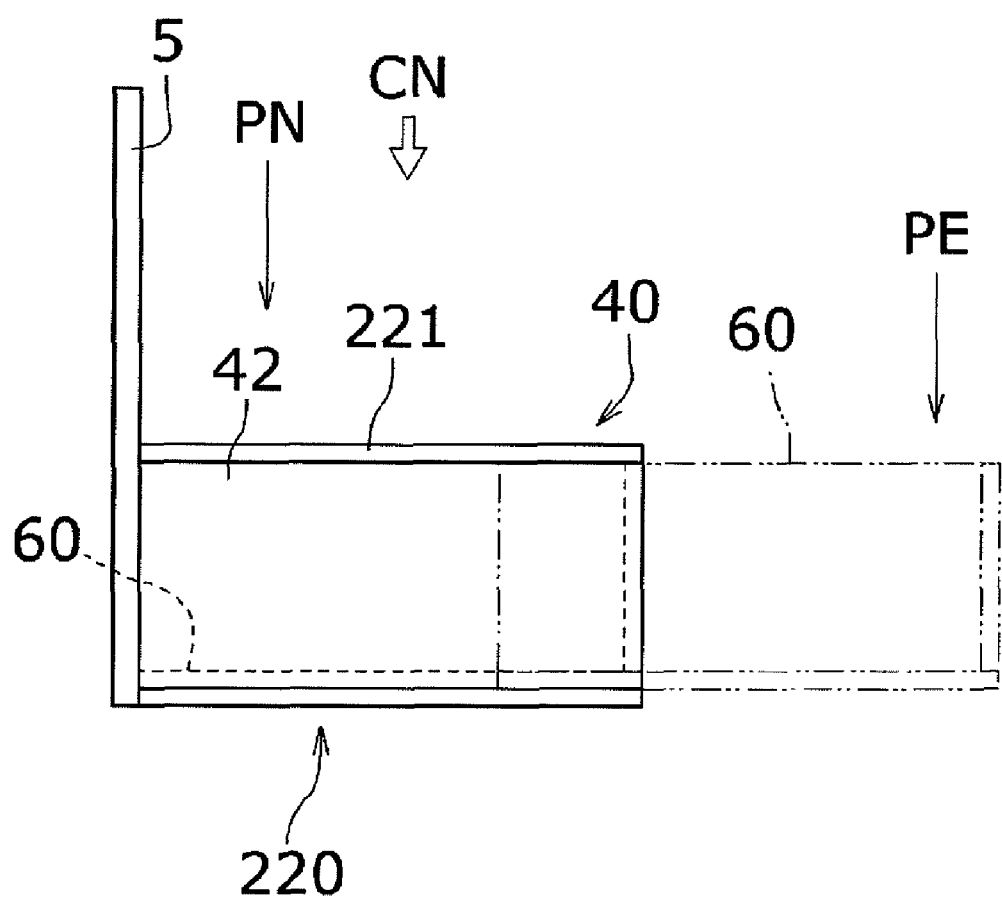
FIG. 9 is a side view showing the rear part of the pick-up style utility vehicle in the normal state (a fourth embodiment)
Figure 10:
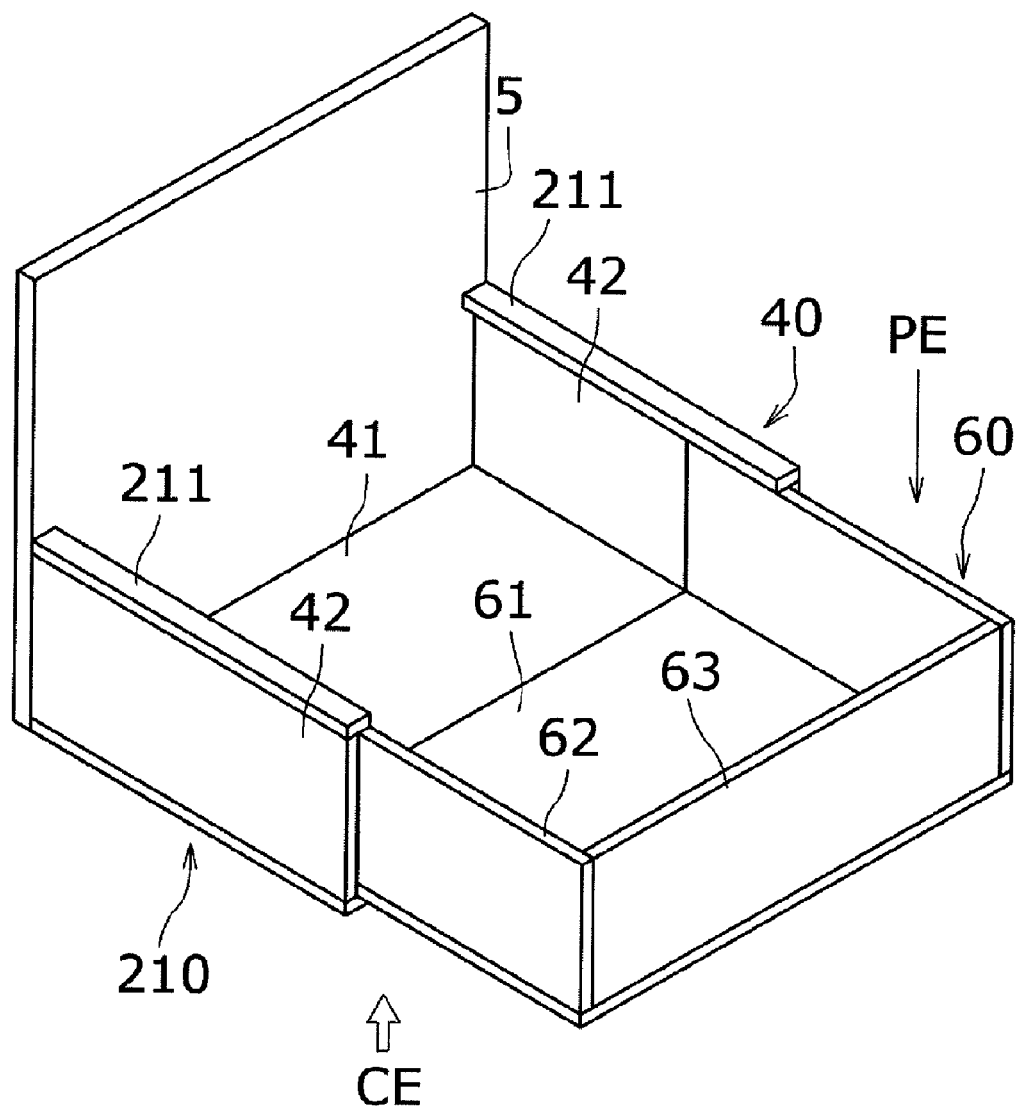
FIG. 10 is a perspective view showing the cargo bed (the fourth embodiment)

FIGS. 9 and 10 show the pick-up style utility vehicle 1 in a fourth embodiment. The fourth embodiment is the same as the first embodiment except differences in a positional relationship between the stationary cargo bed part 40 and the movable cargo bed part 60, and the cargo bed support mechanism. In the fourth embodiment, parts which are common to the first embodiment will be given the same reference numerals. It should be noted that description of positional relationships in the fourth embodiment is based on the posture in the normal state (FIG. 9).

FIG. 9 is a side view showing the rear part of the pick-up style utility vehicle 1 in the normal state. The stationary cargo bed part 40 is arranged on the rear support stand 16. The movable cargo bed part 60 is arranged on the inner side of the stationary cargo bed part 40. The movable cargo bed part 60 at the normal position PN is shown by a broken line. The movable cargo bed part 60 at the expansion position PE is shown by a double chain line.

FIG. 10 is a perspective view showing the cargo bed. In the fourth embodiment, the cargo bed support mechanism is formed by a second cargo bed slide mechanism 220. The second cargo bed slide mechanism 220 supports the movable cargo bed part 60 slidably in the back and forth direction.

As shown in FIG. 10, the second cargo bed slide mechanism 220 is formed by the stationary cargo bed part 40 and two plate members 221 fixed to the stationary cargo bed part 40. The plate members 221 are fixed to upper faces of the side plates 42 of the stationary cargo bed part 40. Here, the movable cargo bed part 60 is arranged on the inner side of the stationary cargo bed part 40 in the right and left direction. The movable cargo bed part 60 is also arranged on the inner side of the stationary cargo bed part 40 in the vertical direction. The upper side of the side plates 62 of the movable cargo bed part 60 is covered by the plate members 221. Therefore, the movable cargo bed part 60 is movable in the back and forth direction without dropping out of the stationary cargo bed part 40.

The passengers pull the movable cargo bed part 60 rearward while grabbing the movable cargo bed part 60, so that the movable cargo bed part 60 can be moved from the normal position PN to the expansion position PE.

Fifth Embodiment

Figure 11:
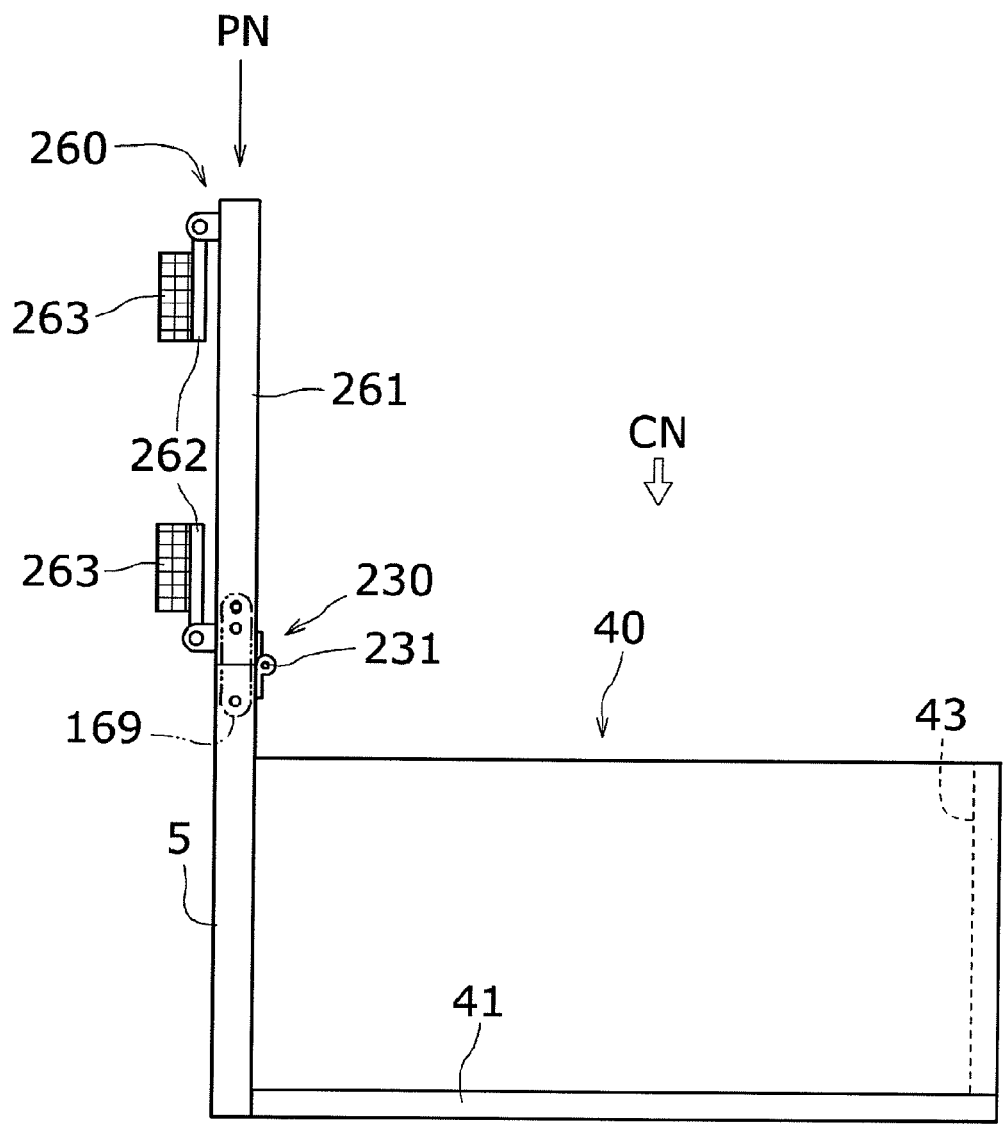
FIG. 11 is a side view showing the rear part of the pick-up style utility vehicle in a first stage (the normal state) (a fifth embodiment)

FIGS. 11 to 15 show the pick-up style utility vehicle 1 in a fifth embodiment. The fifth embodiment is the same as the first embodiment except differences in a configuration of a movable cargo bed part 260, and the cargo bed support mechanism. In the fifth embodiment, parts which are common to the first embodiment will be given the same reference numerals. It should be noted that description of positional relationships in the fifth embodiment is based on the posture in the normal state (FIG. 11).

FIGS. 11, 13 to 15 show four stages from the normal state to the expanded state.

FIG. 11 is a side view showing the rear part of the pick-up style utility vehicle 1 in a first stage (the normal state). In the fifth embodiment, the movable cargo bed part 260 is provided on the upper side of the screen 5. In the fifth embodiment, the cargo bed support mechanism is a cargo bed rotary support mechanism 230 for supporting the movable cargo bed part 260 pivotably on a horizontal shaft 231 in the right and left direction relative to an upper end of the screen 5. Specifically, the cargo bed rotary support mechanism 230 is formed by a hinge. In FIG. 11, the movable cargo bed part 260 is immediately above the screen 5. At this time, the movable cargo bed part 260 is at the normal position PN. A plate hook 169 for connecting the screen 5 and a bottom plate 261 of the movable cargo bed part 260 is provided in order to maintain the movable cargo bed part 260 at the normal position PN. The plate hook 169 is detachable from the screen 5 and the bottom plate 261.

Figure 12:
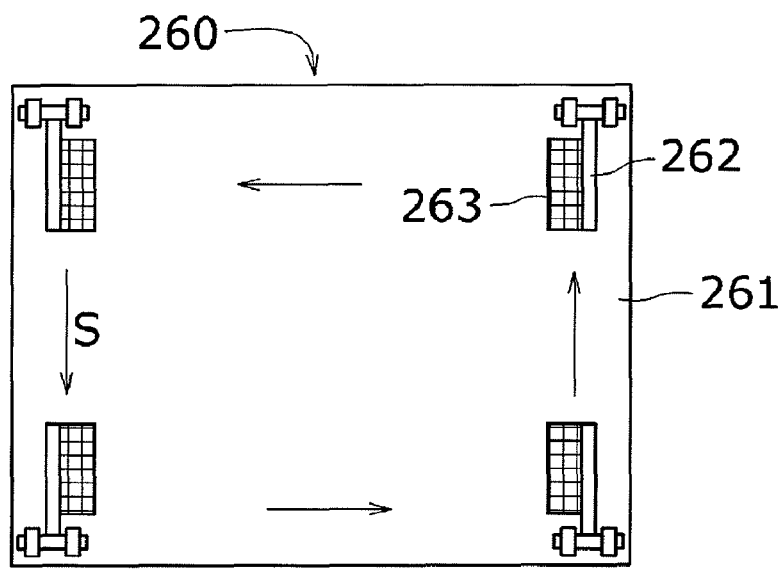
FIG. 12 is a front view showing a movable cargo bed part (the fifth embodiment)

FIG. 12 is a front view showing the movable cargo bed part 260. In FIG. 12, the movable cargo bed part 260 is provided with the bottom plate 261, four support shafts 262, and four accordion members 263. The support shafts 262 are rotatably supported on the bottom plate 261 and also selectable between a standing state and a lying state. The support shafts 262 in the standing state are vertical to the bottom plate 261, and the support shafts 262 in the lying state are parallel to the bottom plate 261. The accordion members 263 are respectively supported by the support shafts 262. In the normal state (FIG. 11), the support shafts 262 are in the lying state.

Figure 13:
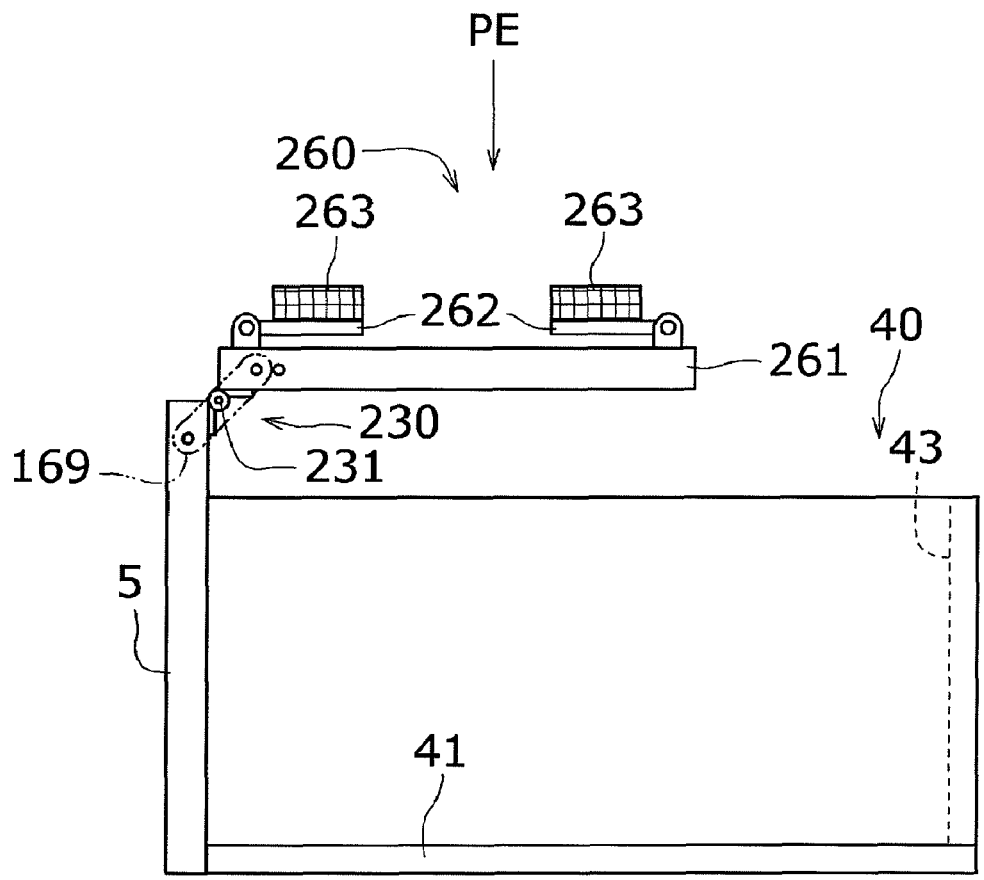
FIG. 13 is a side view showing the rear part of the pick-up style utility vehicle in a second stage (the fifth embodiment)

FIG. 13 is a side view showing the rear part of the pick-up style utility vehicle 1 in a second stage. In the second stage, the passengers bring the movable cargo bed part 260 down rearward, so that the movable cargo bed part 260 is moved from the normal position PN to the expansion position PE. In FIG. 13, the movable cargo bed part 260 is at the expansion position PE. At this time, the bottom plate 261 of the movable cargo bed part 260 is substantially horizontal. The plate hook 169 is attached in order to maintain the movable cargo bed part 260 at the expansion position PE.

Figure 14:
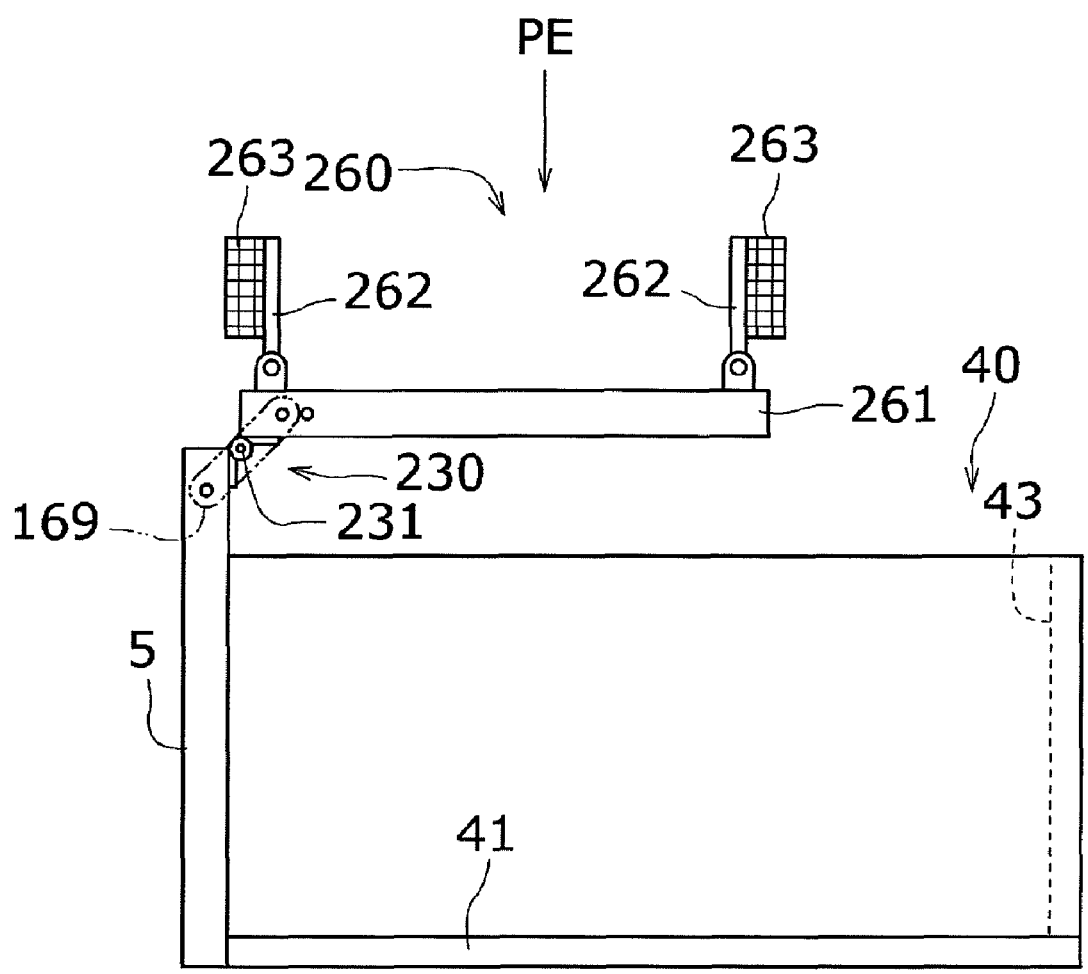
FIG. 14 is a side view showing the rear part of the pick-up style utility vehicle in a third stage (the fifth embodiment)

FIG. 14 is a side view showing the rear part of the pick-up style utility vehicle 1 in a third stage. In the third stage, the passengers move the support shafts 262 on the bottom plate 261 from the lying stage to the standing state.

Figure 15:
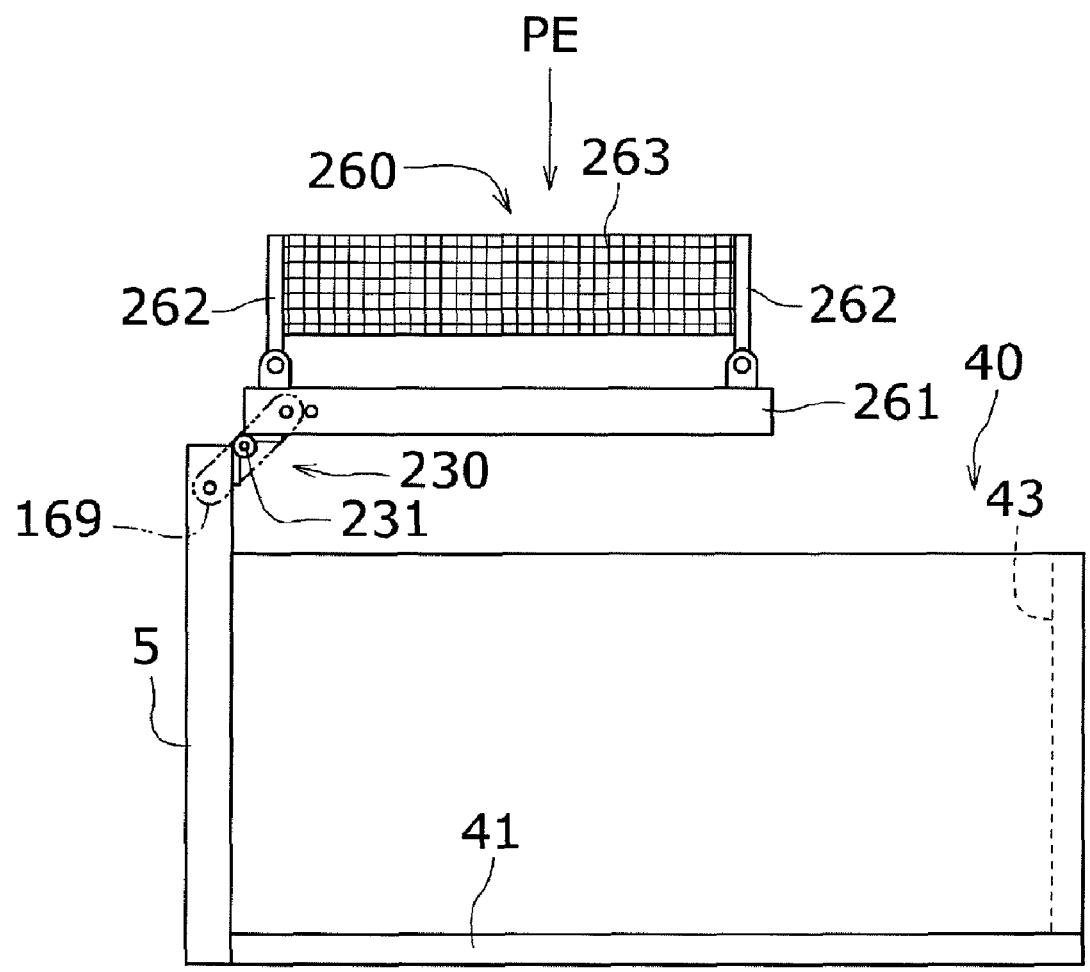
FIG. 15 is a side view showing the rear part of the pick-up style utility vehicle in a fourth stage (the expanded state) (the fifth embodiment)

FIG. 15 is a side view showing the rear part of the pick-up style utility vehicle 1 in a fourth stage (the expanded state). In the fourth stage, the passengers spread the accordion member 263 and also fix an end of the spread accordion member 263 to the support shaft 262 adjacent to the support shaft 262 from which the accordion member is spread. The passengers perform the same processing for all the four accordion members 263. With regard to the accordion members 263, the spreading directions S are respectively shown in FIG. 12. Thereby, the accordion members 263 are developed into a square tube having an axis in the vertical direction. In such a way, four side plates surrounding the front, rear, right and left sides are formed on the bottom plate 261. The interior of the developed accordion members 263 can be utilized as storage space.

Sixth Embodiment

Figure 16:
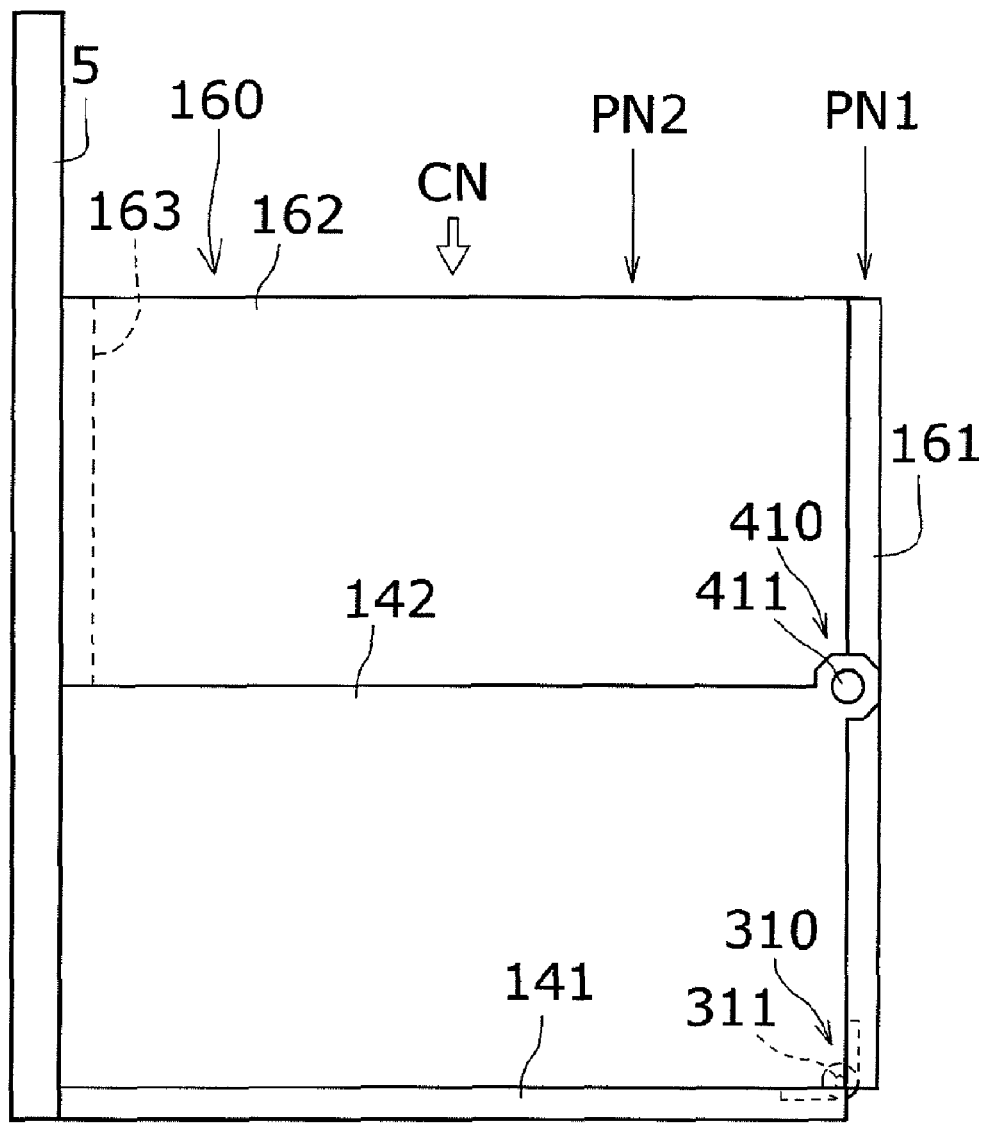
FIG. 16 is a side view showing the rear part of the pick-up style utility vehicle in the normal state (a sixth embodiment)

FIGS. 16 to 19 show the pick-up style utility vehicle 1 in a sixth embodiment. The sixth embodiment has different configurations relating to the cargo bed from the first embodiment. The sixth embodiment is the same as the first embodiment with regard to the other configurations. In the sixth embodiment, parts which are common to the first embodiment will be given the same reference numerals. It should be noted that description of positional relationships in the sixth embodiment is based on the posture in the normal state (FIG. 16).

FIG. 16 is a side view showing the rear part of the pick-up style utility vehicle 1 in the normal state. A stationary bottom plate 141, two stationary side plates 142, 142, a movable bottom plate 161, two movable side plates 162, 162, and a movable rear plate 163 are provided in the sixth embodiment as the configurations relating to the cargo bed. The stationary bottom plate 141 is fixed onto the rear support stand 16. The two stationary side plates 142, 142 are provided in ends of the stationary bottom plate 141 in the right and left direction. The movable rear plate 163 is fixed to front ends of the two movable side plates 162, 162. The two movable side plates 162, 162 and the movable rear plate 163 serve as a movable plate part 160. The movable bottom plate 161 and the movable plate part 160 are movable relative to the chassis 6 of the pick-up style utility vehicle 1.

A first bottom plate rotary support mechanism 310 is provided in the sixth embodiment as a bottom plate support mechanism for supporting the movable bottom plate 161. The first bottom plate rotary support mechanism 310 supports the movable bottom plate 161 pivotably on a horizontal shaft 311 in the right and left direction relative to a rear end of the stationary bottom plate 141. The first bottom plate rotary support mechanism 310 is formed by a hinge, for example. The horizontal shaft 311 is a hinge shaft.

A first side plate rotary support mechanism 410 is provided in the sixth embodiment as a side plate support mechanism for supporting the movable plate part 160 (the movable sideplate 162). The first side plate rotary support mechanism 410 supports the movable side plate 162 pivotably on a horizontal shaft 411 in the right and left direction relative to a rear upper end of the stationary side plate 142. The first side plate rotary support mechanism 410 is formed by a hinge, for example. The horizontal shaft 411 is a hinge shaft.

Figure 17:
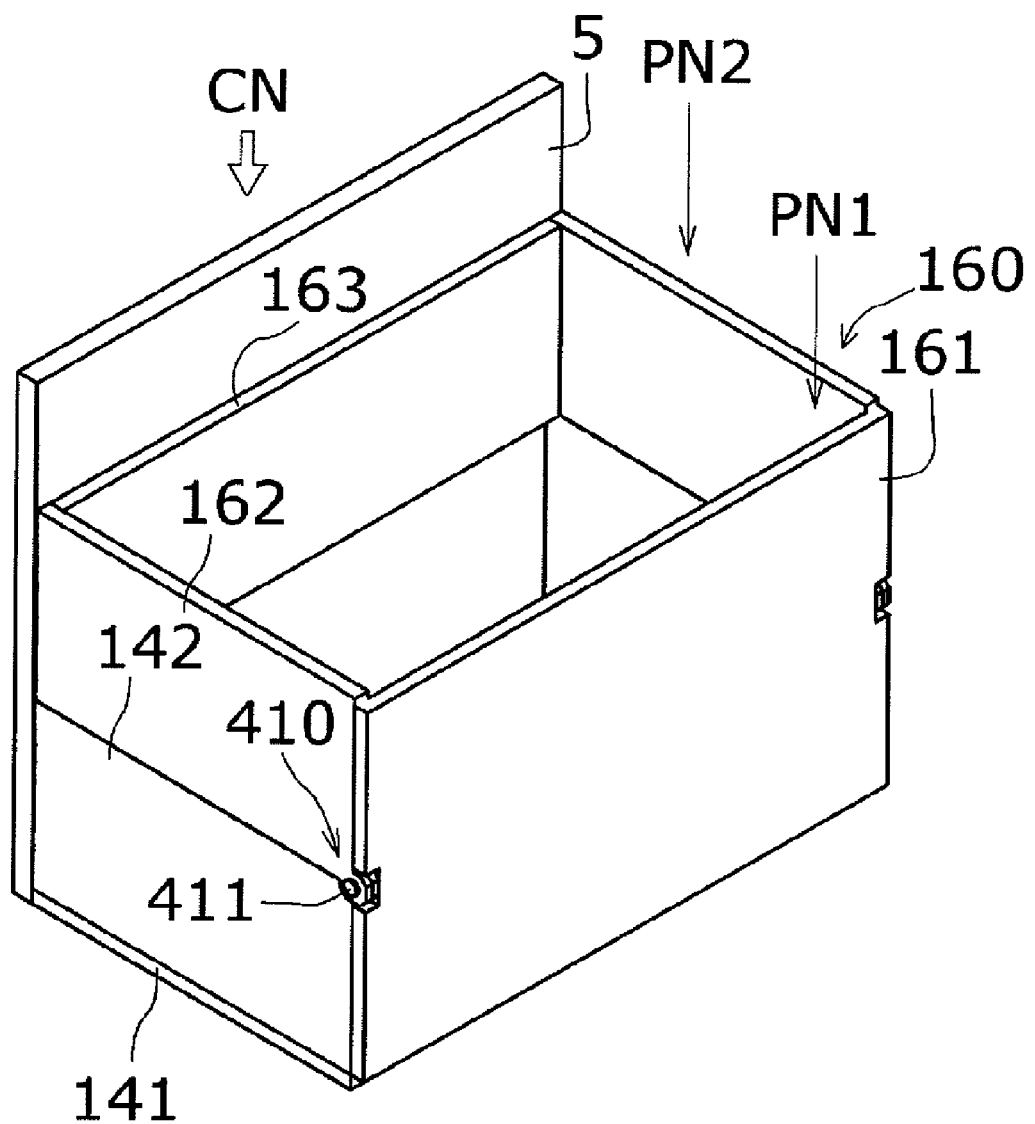
FIG. 17 is a perspective view showing the cargo bed in a first stage (the normal state) (the sixth embodiment)
Figure 18:
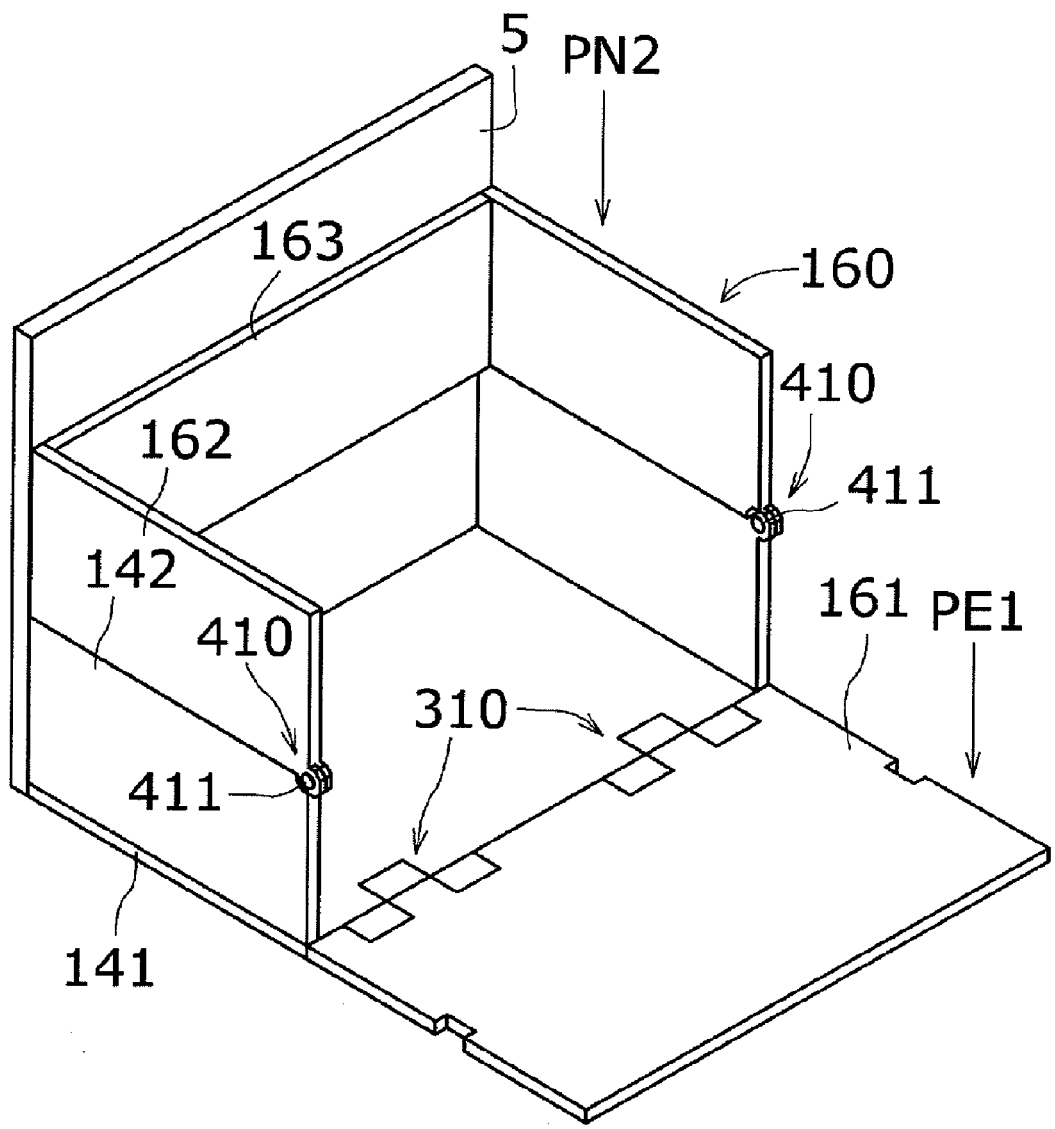
FIG. 18 is a perspective view showing the cargo bed in a second stage (the sixth embodiment)
Figure 19:
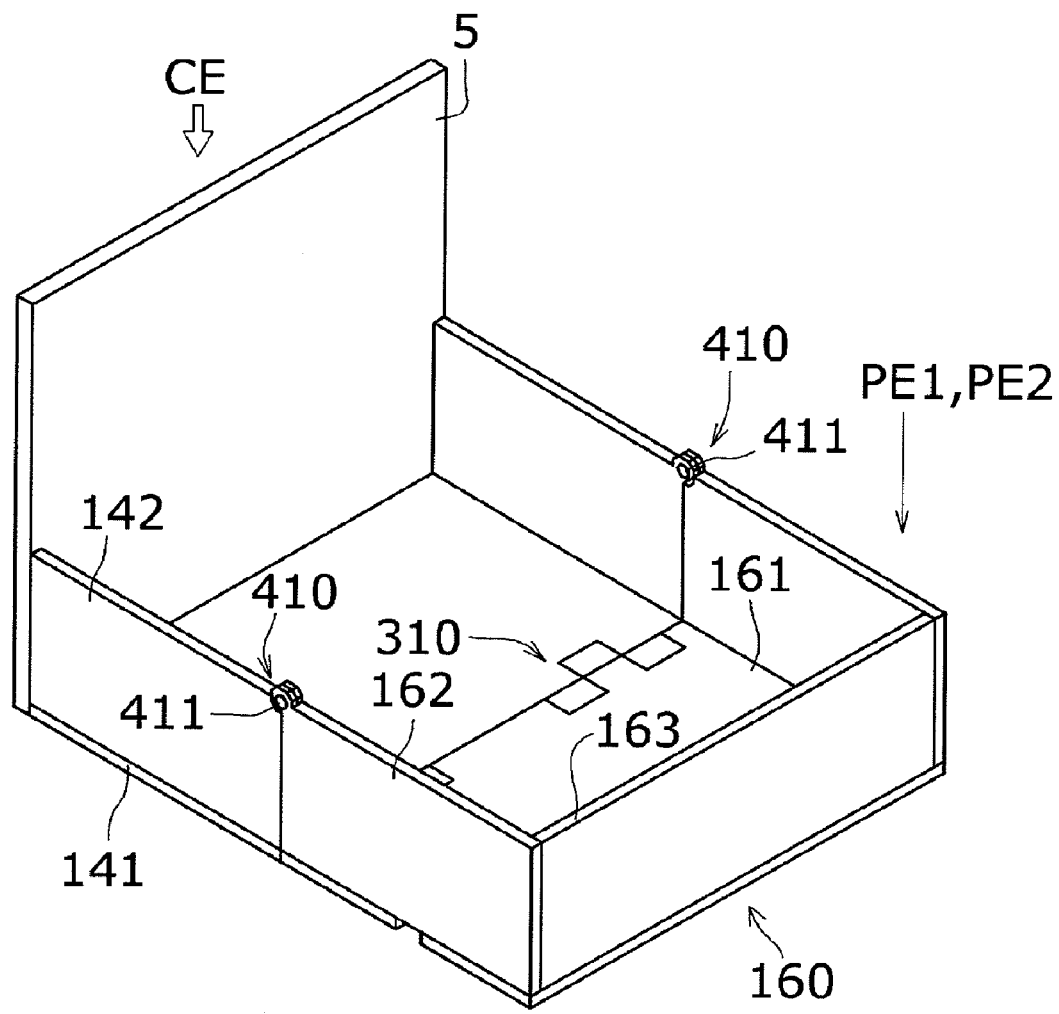
FIG. 19 is a perspective view showing the cargo bed in a third stage (the expanded state) (the sixth embodiment)

FIGS. 17 to 19 show three stages from the normal state to the expanded state.

FIG. 17 is a perspective view showing the cargo bed CN in a first stage (the normal state). In FIG. 17, the movable bottom plate 161 is vertical to the stationary bottom plate 141. A position of the movable bottom plate 161 at this time is a first normal position PN1. The movable side plates 162 are positioned immediately above the stationary side plates 142. A position of the movable plate part 160 (the movable side plates 162) is a second normal position PN2. The cargo bed CN in the normal state is formed by the stationary bottom plate 141, the two stationary side plates 142, the movable bottom plate 161 at the first normal position PN1, and the movable plate part 160 at the second normal position PN2.

The stationary bottom plate 141 serves as the bottom face of the cargo bed CN in the normal state. The stationary side plates 142 and the two movable side plates 162 at the second normal position PN2 serve as the side faces of the cargo bed CN in the normal state. The movable bottom plate 161 at the first normal position PN1 serves as the rear face of the cargo bed CN in the normal state. The movable rear plate 163 at the second normal position PN2 and the screen 5 serve as the front face of the cargo bed CN in the normal state.

FIG. 18 is a perspective view showing the cargo bed in a second stage. The passengers bring the movable bottom plate 161 down rearward, so that the movable bottom plate 161 is moved from the first normal position PN1 to a first expansion position PE1. The movable bottom plate 161 at the first expansion position PE1 is placed side by side with the stationary bottom plate 141 in the horizontal direction.

FIG. 19 is a perspective view showing the cargo bed CE in a third stage (the expanded state). The passengers bring the movable plate part 160 down rearward, so that the movable plate part 160 is moved from the second normal position PN2 to a second expansion position PE2. The movable side plates 162 at the second expansion position PE2 are placed side by side with the stationary side plates 142 in the horizontal direction. The cargo bed CE in the expanded state is formed by the stationary bottom plate 141, the two stationary side plates 142, the movable bottom plate 161 at the first expansion position PE1, and the movable plate part 160 at the second expansion position PE2.

The stationary bottom plate 141 and the movable bottom plate 161 at the first expansion position PE1 serve as the bottom face of the cargo bed CE in the expanded state. The stationary side plates 142 and the two movable side plates 162 at the second expansion position PN2 serve as the side faces of the cargo bed CE in the expanded state. The movable rear plate 163 at the second expansion position PE serves as the rear face of the cargo bed CE in the expanded state. The screen 5 serves as the front face of the cargo bed CE in the expanded state.

The cargo bed is expandable rearward in the sixth embodiment. Therefore, when the cargo bed is changed between the normal state and the expanded state, the cargo bed is not abutted with the screen 5. Therefore, the passengers are not required to transport the screen 5 at the time of changing the cargo bed.

Seventh Embodiment

Figure 20:
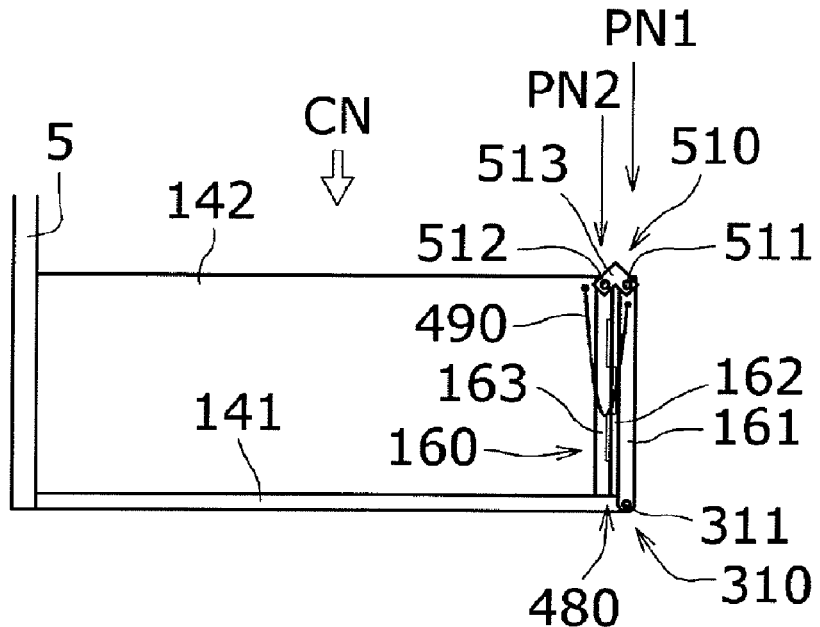
FIG. 20 is a side view showing the cargo bed in a first stage (the normal state) (a seventh embodiment)

FIGS. 20 to 23 show the pick-up style utility vehicle 1 in a seventh embodiment. The seventh embodiment is the same as the sixth embodiment except differences in a positional relationship of the movable side plates 162 and the side plate support mechanism. In the seventh embodiment, parts which are common to the first and sixth embodiments will be given the same reference numerals. It should be noted that description of positional relationships in the seventh embodiment is based on the posture in the normal state (FIG. 20).

FIG. 20 is a side view showing the cargo bed CN in a first stage (the normal state). In the seventh embodiment, the movable bottom plate 161 is movable relative to the stationary bottom plate 141, the movable rear plate 163 is movable relative to the movable bottom plate 161, and the movable side plates 162 are movable relative to the movable rear plate 163. That is, the movable side plates 162 are supported so that movement of the movable side plates 162 depends on movement of the movable bottom plate 161.

In FIG. 20, the movable bottom plate 161 is pivotably supported on the rear end of the stationary bottom plate 141 by the first bottom plate rotary support mechanism 310. The movable plate part 160 (the movable rear plate 163) is pivotably supported on an upper end (a front end) of the movable bottom plate 161 by a first rear plate rotary support mechanism 510. The first rear plate rotary support mechanism 510 is formed by a first horizontal shaft 511 provided in the upper end (the front end) of the movable bottom plate 161, a second horizontal shaft 512 provided in an upper end (an edge) of the movable rear plate 163, and a L shape bracket 513 for supporting the first horizontal shaft 511 and the second horizontal shaft 512. The first horizontal shaft 511 and the second horizontal shaft 512 are horizontal shafts in the right and left direction. The two movable side plates 162 are respectively pivotably supported on both right and left ends of the movable rear plate 163 by sideplate rotary support mechanisms 480. The side plate rotary support mechanisms 480 support the movable side plates 162 pivotably on vertical shafts 481 (FIG. 23) relative to the movable rear plate 163. The side plate rotary support mechanisms 480 are formed by hinges, for example.

In FIG. 20, the movable bottom plate 161 is at the first normal position PN1. The movable bottom plate 161 at the first normal position PN1 serves as the rear face of the cargo bed CN in the normal state. The movable plate part 160 including the movable side plates 162 and the movable rear plate 163 is at the second normal position PN2. The movable side plates 162 and the movable rear plate 163 are closed down to the movable bottom plate 161 at the second expansion position PN2. That is, posture of the movable side plates 162 and the movable rear plate 163 is parallel to the movable bottom plate 161.

Figure 21:
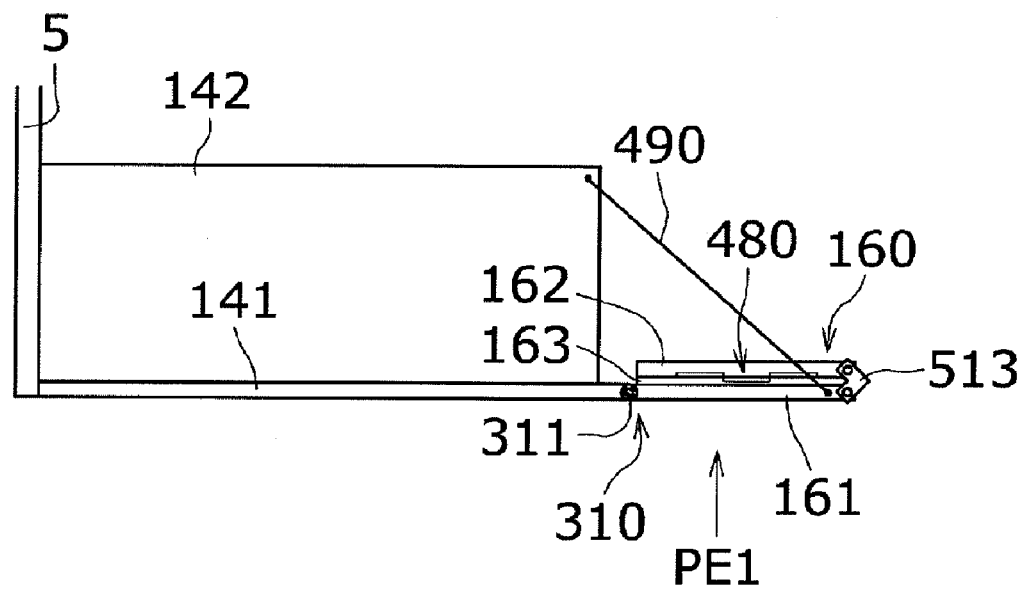
FIG. 21 is a side view showing the cargo bed in a second stage (the seventh embodiment)

FIG. 21 is a side view showing the cargo bed in a second stage. The passengers bring the movable bottom plate 161 down rearward, so that the movable bottom plate 161 is moved from the first normal position PN1 to the first expansion position PE1. FIG. 21 shows the movable bottom plate 161 at the first expansion position PE1. Here, the rear upper end of the stationary side plate 142 is connected to the L shape bracket 513 by a chain 490. The chain 490 is a fixing mechanism for holding the movable bottom plate 161 at the first expansion position PE1. Specifically, length of the chain 490 is set so that the chain 490 is stretched when the movable bottom plate 161 is at the first expansion position PE1.

Figure 22:
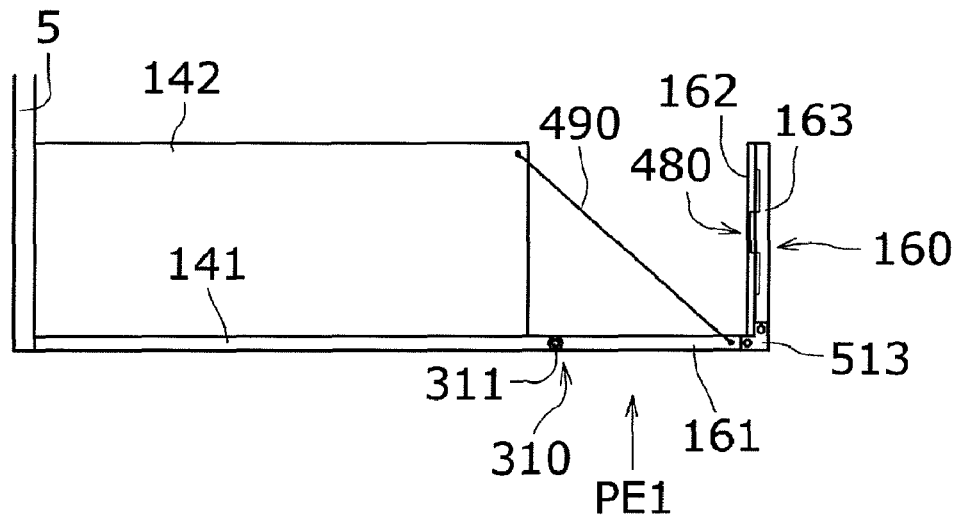
FIG. 22 is a side view showing the cargo bed in a third stage (the seventh embodiment)

FIG. 22 is a side view showing the cargo bed in a third stage. The passengers make the movable plate part 160 stand up. FIG. 22 shows the movable plate part 160 in the standing state.

Figure 23:
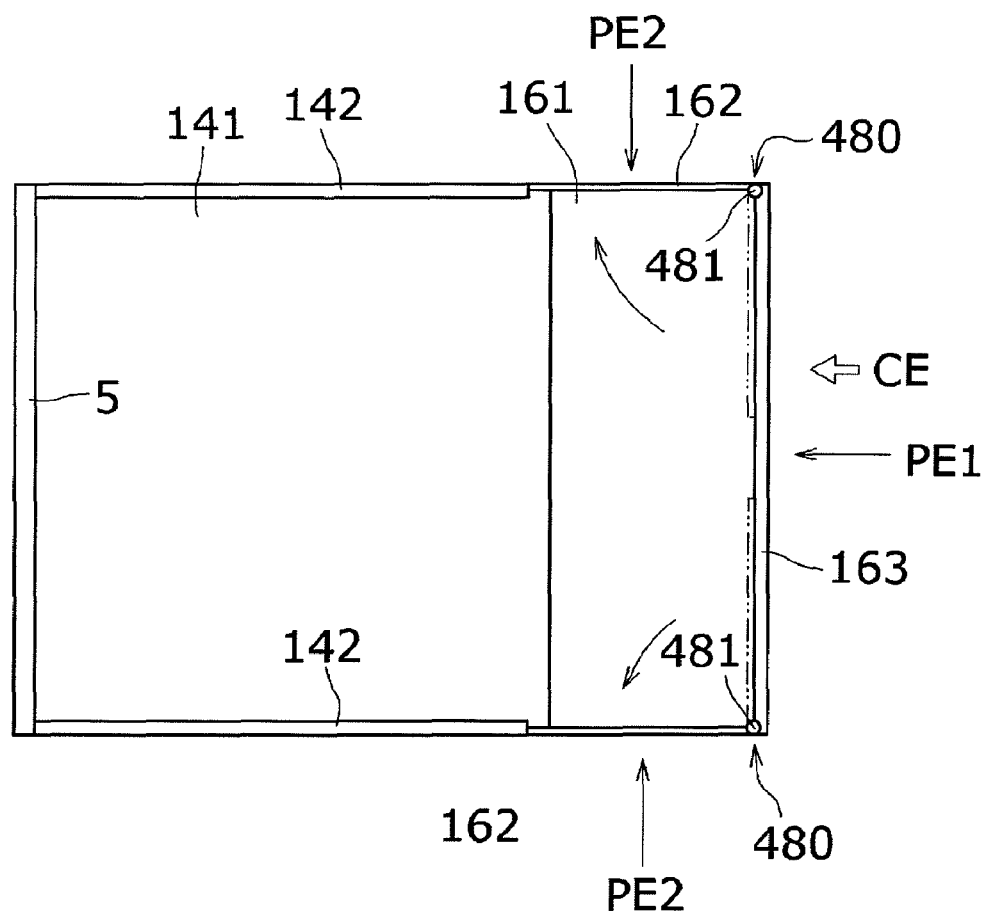
FIG. 23 is a plan view showing the cargo bed in a fourth stage (the expanded state) (the seventh embodiment)

FIG. 23 is a plan view showing the cargo bed CE in a fourth stage (the expanded state). The passengers open the movable side plates 162 relative to the movable rear plate 163, so that the movable side plates 162 are moved to the second expansion position PE2. The movable side plates 162 at the second expansion position PE2 serve as the side faces of the cargo bed CE in the expanded state together with the stationary side plates 142.

In the seventh embodiment, the movable side plates 162 are supported on the movable bottom plate 161 via the first rear plate rotary support mechanism 510 and the side plate rotary support mechanism 480. That is, the first rear plate rotary support mechanism 510 and the side plate rotary support mechanism 480 serve as a side plate opening and closing support mechanism for openably supporting the movable side plates 162 relative to the movable bottom plate 161. Here, a configuration in which the movable side plates 162 are directly supported on the movable bottom plate 161 may be adapted instead of the configuration in which the movable side plates 162 are supported on the movable bottom plate 161 via the movable rear plate 163.

In the seventh embodiment, the movement of the movable side plates 162 depends on the movement of the movable bottom plate 161. Therefore, the side plate support mechanism in the seventh embodiment is formed not only by the side plate opening and closing support mechanism (510 and 480) but also by a set of the first bottom plate rotary support mechanism 310 and the side plate opening and closing support mechanism (510 and 480).

Eighth Embodiment

Figure 24:
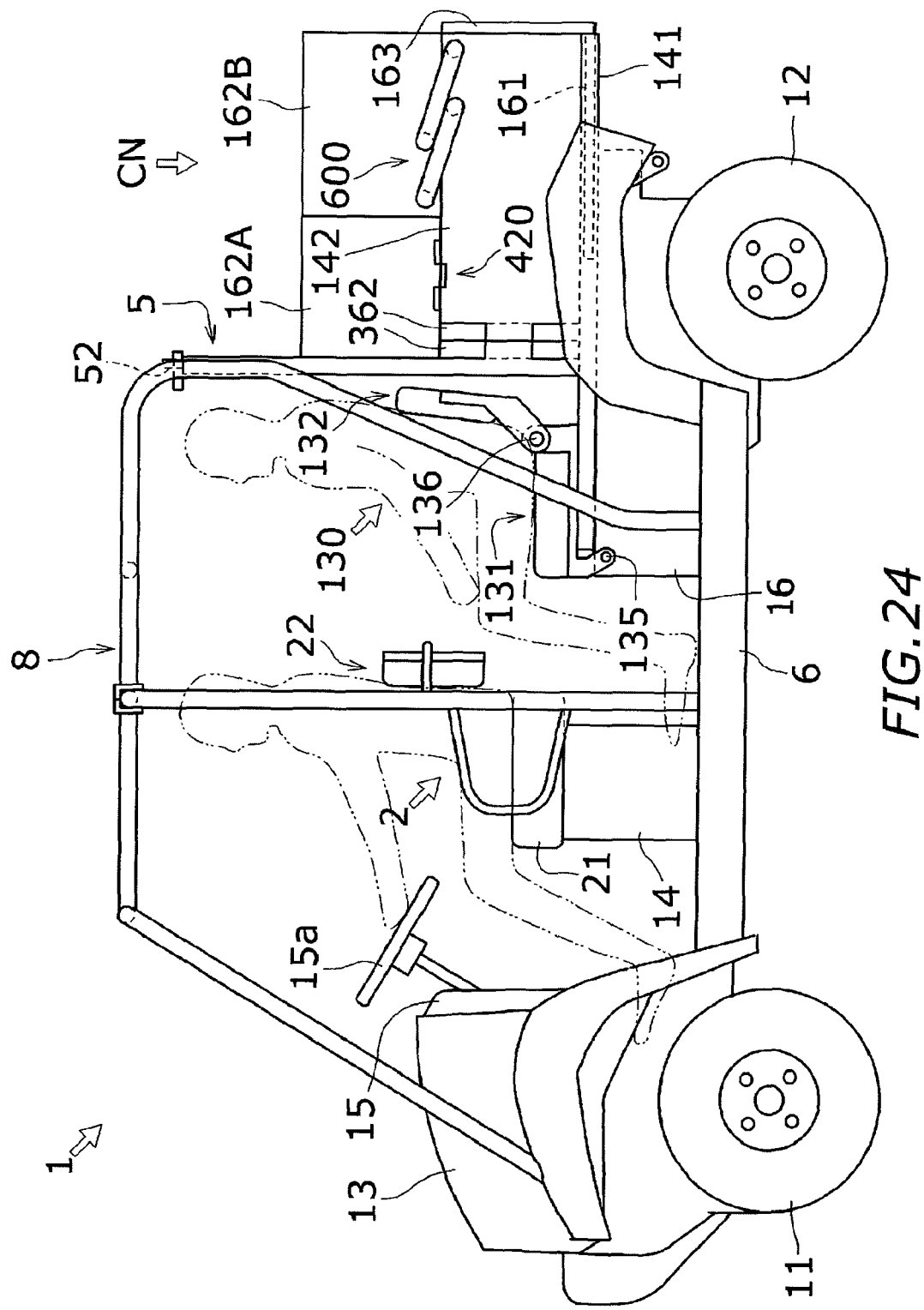
FIG. 24 is a side view showing the pick-up style utility vehicle in the normal state (an eighth embodiment)
Figure 25:
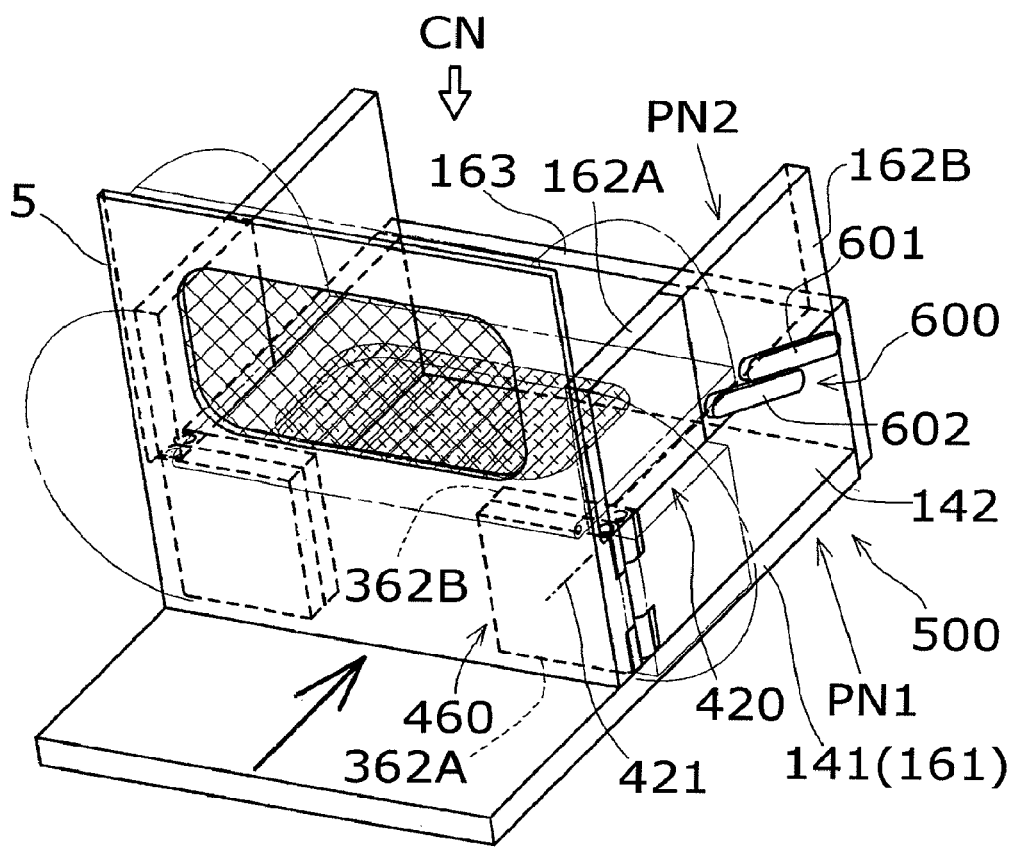
FIG. 25 is a perspective view showing the cargo bed in the normal state (the eighth embodiment)

FIGS. 24 to 27 show the pick-up style utility vehicle 1 in an eighth embodiment. The eighth embodiment is the same as the sixth embodiment except differences in a configuration of a rear seat 130, existence of two movable side plates 162A, 162B, a configuration of the side plate support mechanism, and a configuration of the bottom plate support mechanism. In the eighth embodiment, parts which are common to the first and sixth embodiments will be given the same reference numerals. It should be noted that description of positional relationships in the eighth embodiment is based on the posture in the normal state (FIGS. 24 and 25).

FIG. 24 is a side view showing the pick-up style utility vehicle 1 in the normal state. In the eighth embodiment, the movable rear seat 130 is provided instead of the rear seat 3 which is not movable. The rear seat 130 is provided with a main seat 131, a backrest 132, a first horizontal shaft 135 in the right and left direction, and a second horizontal shaft 136 in the right and left direction. The main seat 131 is supported pivotably on the first horizontal shaft 135 on the rear support stand 16. The backrest 132 is supported pivotably on the second horizontal shaft 136 on the main seat 131.

Therefore, the passengers pivot the main seat 131 on the horizontal shaft 135, so that the main seat 131 can be moved between a shunting position on the front side and a use position on the rear side. Here, in the eighth embodiment, the stationary bottom plate 141 projects to the front side of the screen 5. The main seat 131 at the use position (the rear position) is disposed on the stationary bottom plate 141. Meanwhile, the main seat 131 at the shunting position (the front position) is placed on the front side of the stationary bottom plate 141. At this time, a front part of the stationary bottom plate 141 is cleared.

In the eighth embodiment, the rear seat 130 is shunted to the front side, the cargo bed is expandable forward. Therefore, the cargo bed is expandable rearward and forward in the eighth embodiment.

Figure 26:
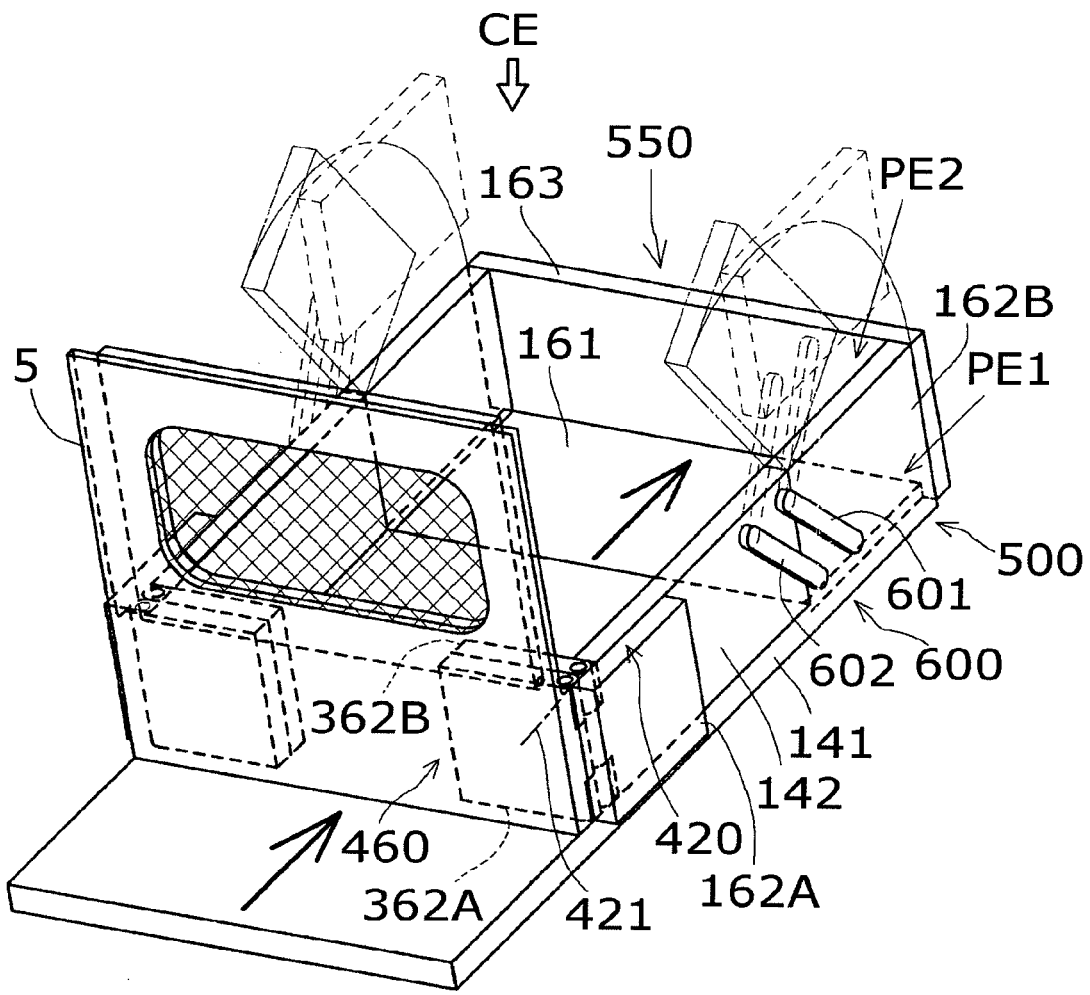
FIG. 26 is a perspective view showing the cargo bed in a rearward expanded state (the eighth embodiment)

With reference to FIGS. 25 and 26, a configuration for expanding the cargo bed rearward will be described. FIG. 25 is a perspective view showing the cargo bed CN in the normal state. FIG. 26 is a perspective view showing the cargo bed CE in a rearward expanded state.

In FIG. 26, the movable bottom plate 161 and the bottom plate support mechanism for guiding the movement of the movable bottom plate 161 are provided in the eighth embodiment. The bottom plate support mechanism is a bottom plate slide mechanism 500 for supporting the movable bottom plate 161 slidably in the back and forth direction relative to the stationary bottom plate 141. The bottom plate slide mechanism 500 is for example formed by a rail formed in the stationary bottom plate 141, and an engagement part to be engaged with the rail fixed to the movable bottom plate 161. The bottom plate slide mechanism 500 is capable of guiding the movement of the movable bottom plate 161 between the first normal position PN1 (FIG. 25) and the first expansion position PE1 (FIG. 26).

In FIG. 26, the movable rear plate 163 serving as the rear face of the cargo bed is provided in the eighth embodiment. The movable rear plate 163 is fixed to a rear end of the movable bottom plate 161. Therefore, the movable rear plate 163 and the movable bottom plate 161 are movable in the back and forth direction due to the bottom plate slide mechanism 500.

In FIG. 26, the two movable side plates 162A, 162B on the rear side and two side plate support mechanisms corresponding to the two movable side plates 162A, 162B are provided in the eighth embodiment as the configuration for expanding the cargo bed rearward. The side plate support mechanism corresponding to the movable side plate 162A is a second side plate rotary support mechanism 420. The side plate support mechanism corresponding to the movable side plate 162B is a first side plate linkage mechanism 600.

The second side plate rotary support mechanism 420 supports the movable side plate 162A pivotably on a horizontal shaft 421 in the back and forth direction relative to the upper end of the stationary side plate 142. The second side plate rotary support mechanism 420 is formed by a hinge, for example.

The first side plate linkage mechanism 600 is a linkage mechanism for guiding movement of the movable side plate 162B between the second normal position PN2 (FIG. 25) and the second expansion position PE2 (FIG. 26). The first side plate linkage mechanism 600 is formed by a parallel link. The first side plate linkage mechanism 600 is provided with an upper link 601 and a lower link 602. The upper link 601 and the lower link 602 connect an upper rear part of the stationary side plate 142 and a lower front part of the movable bottom plate 162B.

In FIG. 25 (the normal state), the movable bottom plate 161 and the movable rear plate 163 are at the first normal position PN1, and the movable side plates 162A, 162B are at the second normal position PN2. The movable bottom plate 161 at the first normal position PN1 is stored inside the stationary bottom plate 141. The rear end of the movable bottom plate 161 is at the substantially same position as the rear end of the stationary bottom plate 141. The movable side plates 162A, 162B at the second normal position PN2 are disposed on the stationary side plates 142. In such a way, the cargo bed CN in the normal state is formed.

In FIG. 26 (the rearward expanded state), the movable bottom plate 161 and the movable rear plate 163 are at the first expansion position, and the movable side plates 162A, 162B are at the second expansion position. The movable side plate 162A at the second expansion position PE2 is arranged on the outer side of the stationary side plate 142 in the right and left direction. The movable side plate 162B at the second expansion position PE2 is placed immediately behind the stationary side plate 142. A rear face of the movable side plate 162B at the second expansion position PE2 is in contact with the movable rear plate 163. In such a way, the cargo bed CE in the rearward expanded state is formed.

Figure 27:
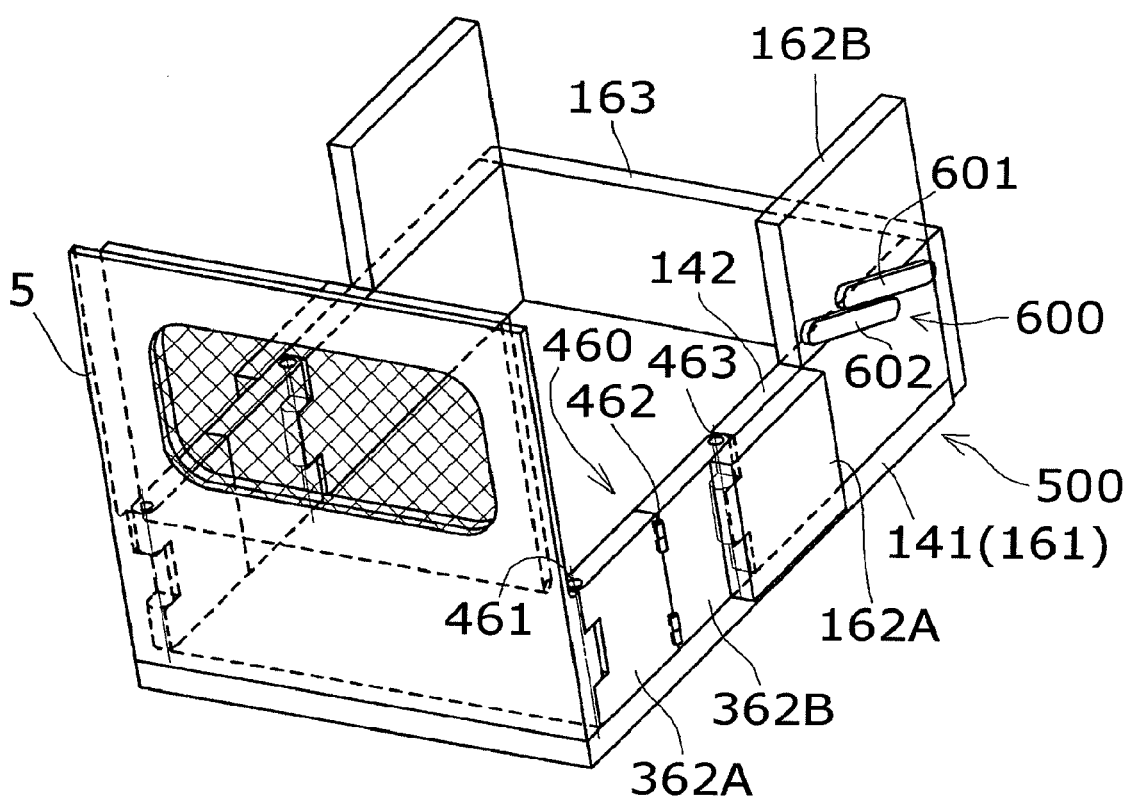
FIG. 27 is a perspective view showing the cargo bed in a forward expanded state (the eighth embodiment)

With reference to FIGS. 25 and 27, a configuration for expanding the cargo bed forward will be described. FIG. 27 is a perspective view showing the cargo bed in a forward expanded state.

Two movable side plates 362A, 362B on the front side and a side plate support mechanism corresponding to the two movable side plates 362A, 362B are provided in the eighth embodiment as the configuration for expanding the cargo bed forward. The side plate support mechanism corresponding to the movable side plates 362A, 362B is a front side plate rotary support mechanism 460.

In FIG. 27, the movable side plate 362A is on the front side, and the movable side plate 362B is on the rear side. The front side plate rotary support mechanism 460 is provided with three vertical shafts 461, 462 and 463. The front side plate rotary support mechanism 460 is formed by three hinges respectively including the vertical shafts 461, 462 and 463, for example. The hinge including the first vertical shaft 461 pivotably connects the screen 5 and the movable side plate 362A. The hinge including the second vertical shaft 462 pivotably connects the movable side plate 362A and the movable side plate 362B. The hinge including the third vertical shaft 463 pivotably connects the movable side plate 362B and the stationary side plate 142. The screen 5 is supported by the two movable side plates 362A, 362A respectively arranged on the right and left sides. The screen 5 is movable relative to the stationary bottom plate 141.

In FIG. 25 (the normal state), the movable side plates 362A, 362B are folded. Therefore, the cargo bed is not expanded forward but in the normal state.

In FIG. 27 (the forward expanded state), the movable side plates 362A, 362B are spread. At this time, the screen 5 is moved to the front side so that the cargo bed is expanded forward. In such a way, the front side plate rotary support mechanism 460 can expand the cargo bed forward.

Since the rear seat 130 to be shunted to the front side is adapted in the eighth embodiment, the cargo bed is expandable not only rearward but also forward in the eighth embodiment. Naturally, the configuration in which the cargo bed is expandable rearward in the eighth embodiment can be adapted to the pick-up style utility vehicle 1 to which the fixed type rear seat 3 is applied as in the first embodiment.

Ninth Embodiment

Figure 28:
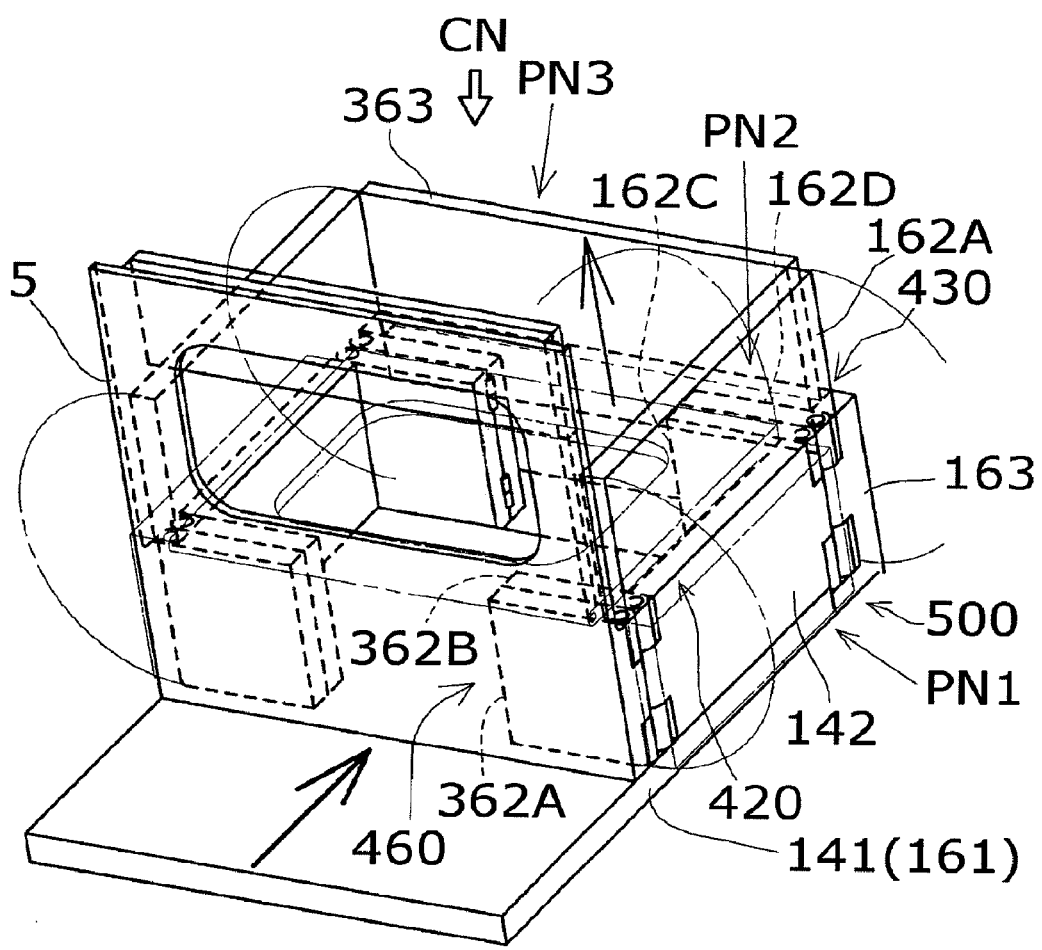
FIG. 28 is a perspective view showing the cargo bed in the normal state (a ninth embodiment)
Figure 29:
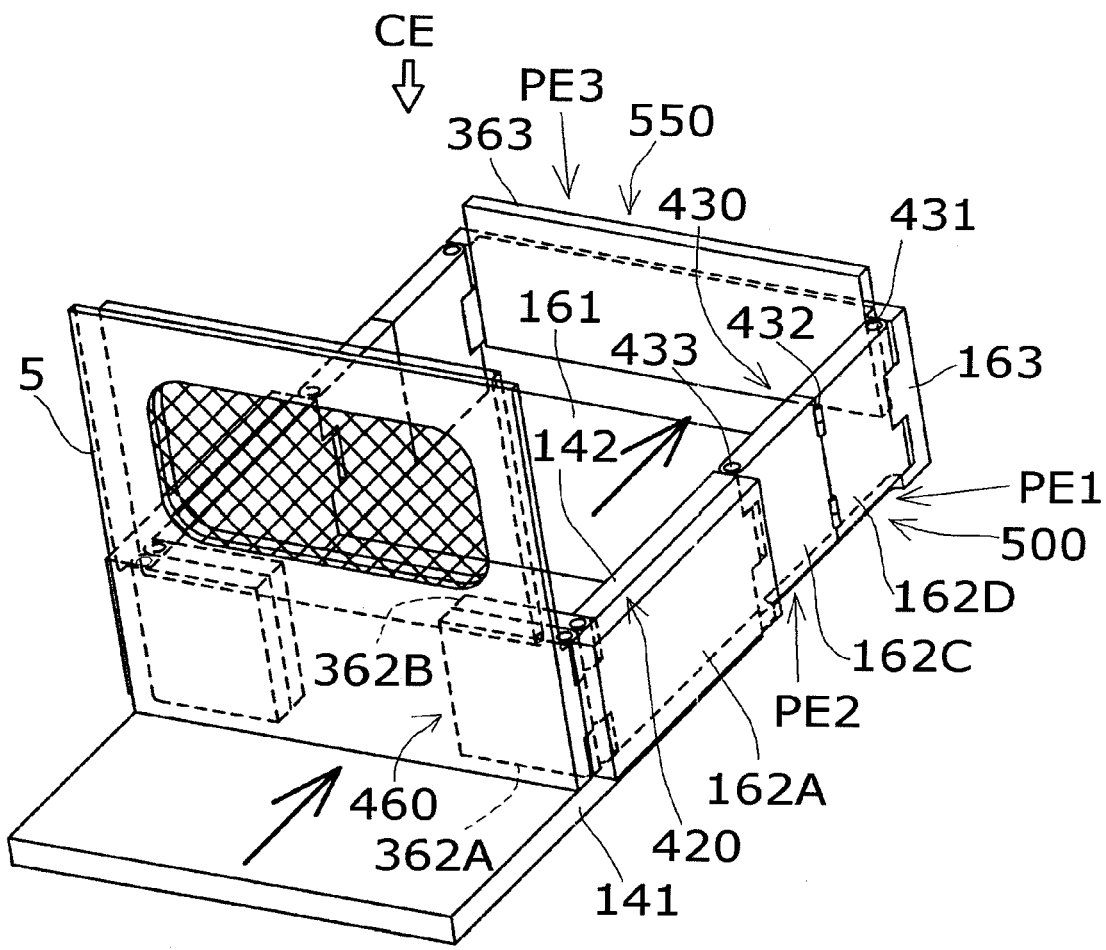
FIG. 29 is a perspective view showing the cargo bed in the rearward expanded state (the ninth embodiment)
Figure 30:
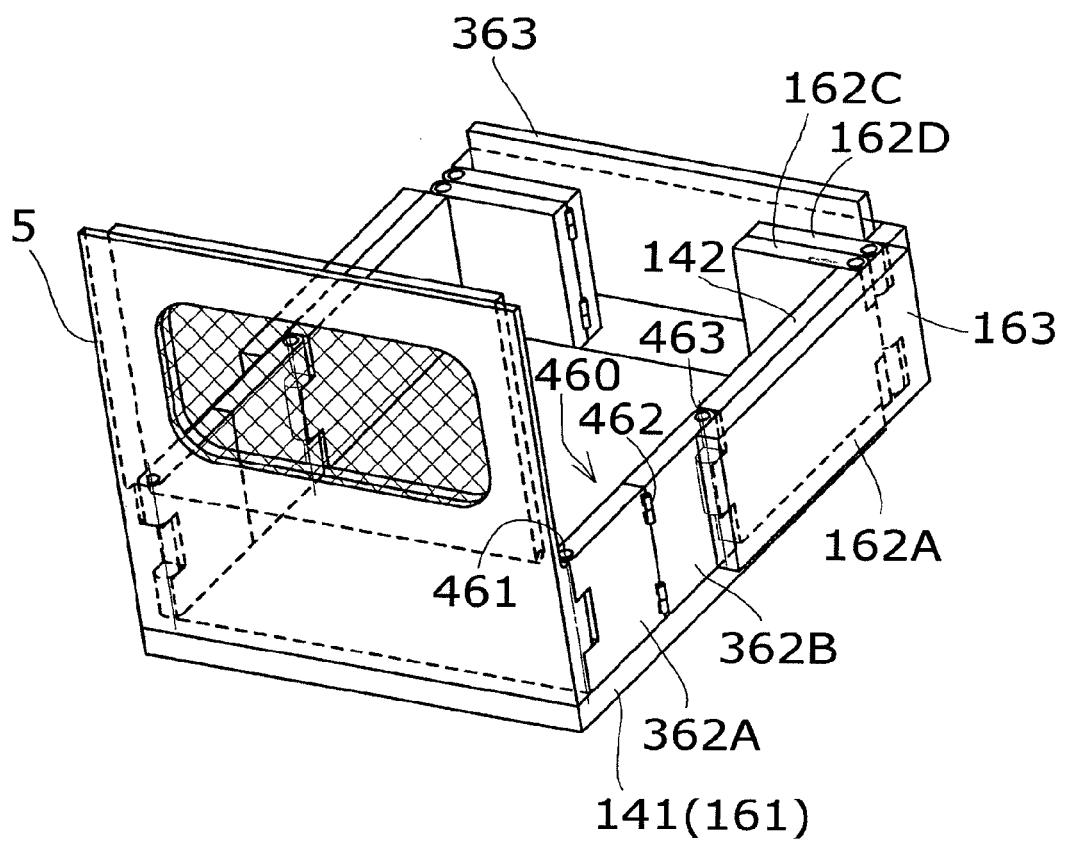
FIG. 30 is a perspective view showing the cargo bed in the forward expanded state (the ninth embodiment)

FIGS. 28 to 30 show the pick-up style utility vehicle 1 in a ninth embodiment. The ninth embodiment is the same as the eighth embodiment except differences in a configuration of the movable side plates and a configuration of the side plate support mechanism. In the ninth embodiment, parts which are common to the first and eighth embodiments will be given the same reference numerals. It should be noted that description of positional relationships in the ninth embodiment is based on the posture in the normal state (FIG. 28).

The ninth embodiment is the same as the eighth embodiment in terms of the bottom plate support mechanism for guiding the movement of the movable bottom plate 161 (the bottom plate slide mechanism 500), and the configuration for expanding the cargo bed forward.

FIG. 28 is a perspective view showing the cargo bed CN in the normal state. Three movable side plates 162A, 162C and 162D on the rear side, and two side plate support mechanism corresponding to the three movable side plates 162A, 162C and 162D are provided in the ninth embodiment as the configuration for expanding the cargo bed rearward. In the ninth embodiment, the movable side plates 162O, 162D are provided instead of the movable side plate 162B in the eighth embodiment. The side plate support mechanism corresponding to the movable side plate 162A is the second side plate rotary support mechanism 420. The side plate support mechanism corresponding to the movable side plates 162C, 162D is a third side plate rotary support mechanism 430. Size of the movable side plate 162A is different but the configuration of the second side plate rotary support mechanism 420 is the same in the eighth and ninth embodiments.

A movable rear plate 363 and a rear plate support mechanism corresponding to the movable rear plate 363 are provided in the ninth embodiment as a configuration for expanding the rear face of the cargo bed upward. The rear plate support mechanism is a rear plate slide mechanism 550. The rear plate slide mechanism 550 supports the movable rear plate 363 slidably in the vertical direction relative to the movable rear plate 163. The rear plate slide mechanism 550 is for example formed by a rail formed in the movable rear plate 163 and an engagement part to be engaged with the rail fixed to the movable rear plate 363.

FIG. 29 is a perspective view showing the cargo bed in the rearward expanded state. In FIG. 29, the third side plate rotary support mechanism 430 is provided with three vertical shafts 431, 432 and 433. The third side plate rotary support mechanism 430 is formed by three hinges respectively including the vertical shafts 431, 432 and 433, for example. The hinge including the first vertical shaft 431 pivotably connects the movable side plate 162D and the movable rear plate 163. The hinge including the second vertical shaft 432 pivotably connects the movable side plate 162C and the movable side plate 162D. The hinge including the third vertical shaft 433 pivotably connects the stationary side plate 142 and the movable side plate 162C. The third side plate rotary support mechanism 430 supports the movable side plates 162C, 162D pivotably on the first vertical shaft 431 relative to the movable bottom plate 161 integrated with the movable rear plate 163.

In FIG. 28 (the normal state), the movable bottom plate 161 and the movable rear plate 163 are at the first normal position PN1, the movable side plates 162A, 162C and 162D are at the second normal position PN2, and the movable rear plate 363 is at a third normal position PN3. The movable side plate 162A at the second normal position PN2 is disposed on the stationary side plate 142. The movable side plates 162C and 162D at the second normal position PN2 are folded. The movable rear plate 363 at the third normal position PN3 is at the same height as the movable side plates 162C and 162D at the second normal position PN2. In such a way, the cargo bed CN in the normal state is formed.

In FIG. 29 (the rearward expanded state), the movable bottom plate 161 and the movable rear plate 163 are at the first expansion position PE1, the movable side plates 162A, 162C and 162D are at the second expansion position PE2, and the movable rear plate 363 is at a third expansion position PE3. The movable side plate 162A at the second expansion position PE2 is arranged on the outer side of the stationary side plate 142 in the right and left direction. The movable side plates 162C and 162D at the second expansion position PE2 are spread. The movable rear plate 363 at the third expansion position PE3 is placed at a position which is higher than the stationary side plate 142 and the movable rear plate 163 and lower than the third normal position PN3. In such a way, the cargo bed CE in the rearward expanded state is formed.

FIG. 30 is a perspective view showing the cargo bed in the forward expanded state. In the ninth embodiment, the cargo bed is also expandable forward as well as the eighth embodiment. FIG. 30 of the ninth embodiment corresponds to FIG. 27 of the eighth embodiment.

Tenth Embodiment

Figure 31:
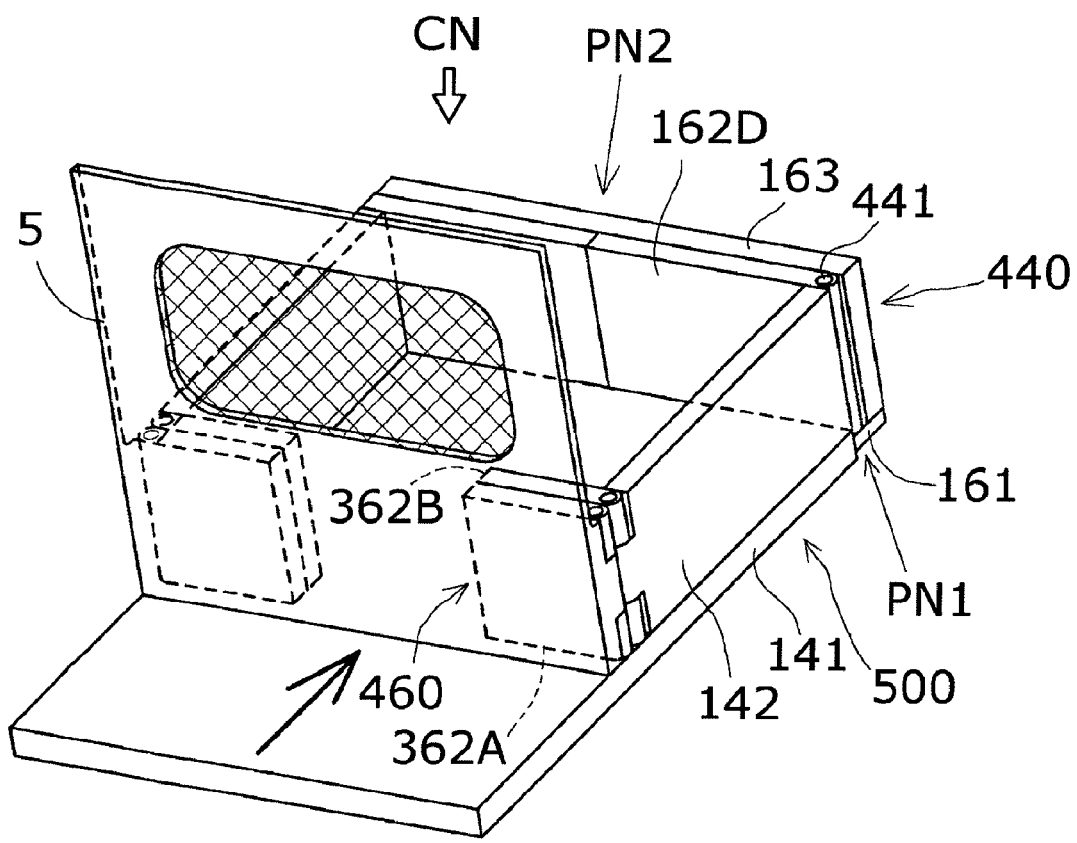
FIG. 31 is a perspective view showing the cargo bed in the normal state (a tenth embodiment)
Figure 32:
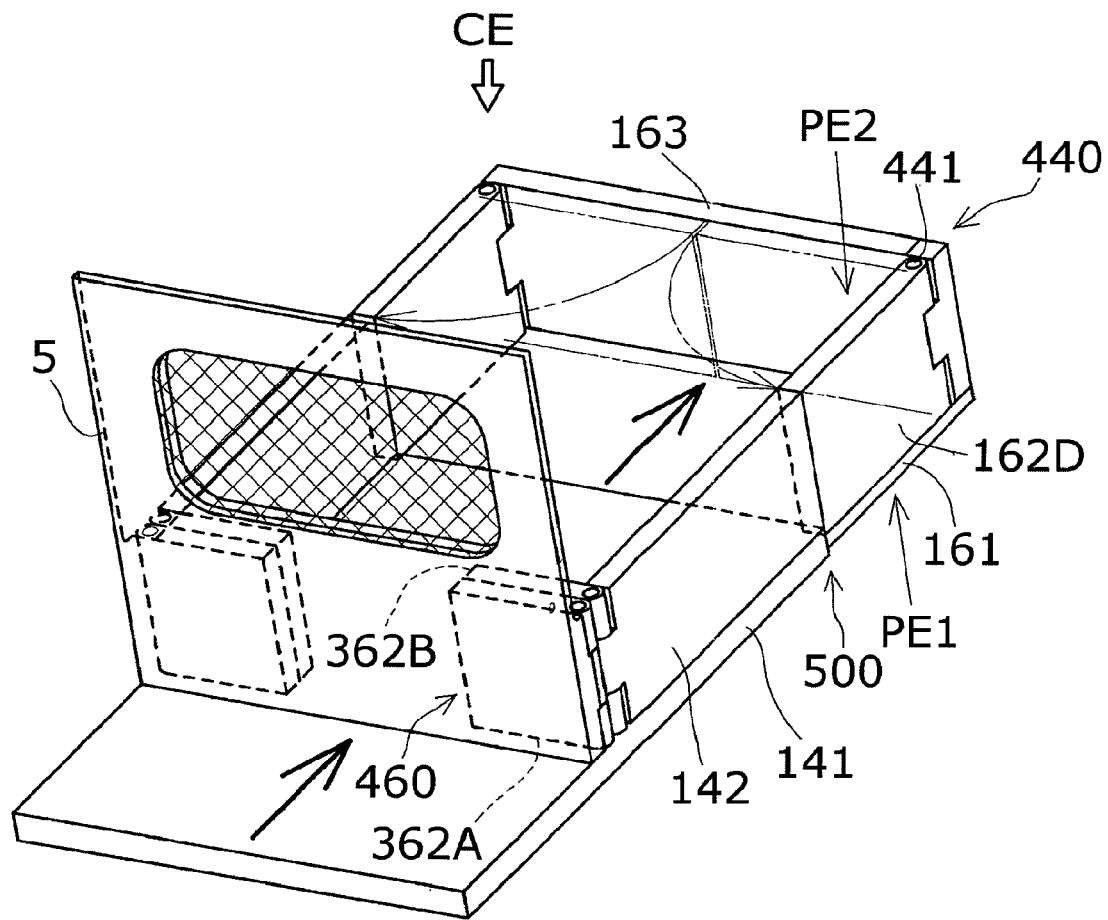
FIG. 32 is a perspective view showing the cargo bed in the rearward expanded state (the tenth embodiment)
Figure 33:
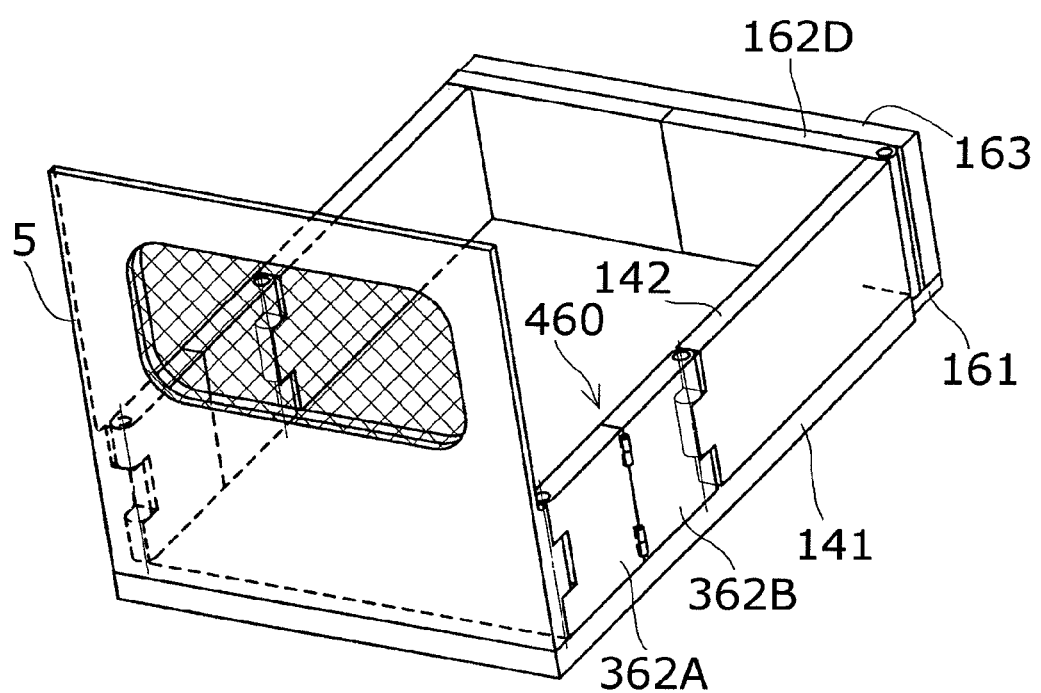
FIG. 33 is a perspective view showing the cargo bed in the forward expanded state (the tenth embodiment)

FIGS. 31 to 33 show the pick-up style utility vehicle 1 in a tenth embodiment. The tenth embodiment is the same as the ninth embodiment except differences in a configuration of the movable side plates and a configuration of the side plate support mechanism. In the tenth embodiment, parts which are common to the first and ninth embodiments will be given the same reference numerals. It should be noted that description of positional relationships in the tenth embodiment is based on the posture in the normal state (FIG. 31).

The tenth embodiment is the same as the ninth embodiment in terms of the bottom plate support mechanism for guiding the movement of the movable bottom plate 161 (the bottom plate slide mechanism 500) and the configuration for expanding the cargo bed forward.

FIG. 31 is a perspective view showing the cargo bed CN in the normal state. The movable side plate 162D on the rear side, and the side plate support mechanism corresponding to the movable side plate 162D are provided in the tenth embodiment as the configuration for expanding the cargo bed rearward. In the tenth embodiment, the movable side plates 162A, 162C in the ninth embodiment are removed. The side plate support mechanism corresponding to the movable side plate 162D is a third side plate rotary support mechanism 440. The third side plate rotary support mechanism 440 in the tenth embodiment and the third side plate rotary support mechanism 430 in the ninth embodiment are common in a point that a vertical shaft is provided as a rotation shaft but partially different in terms of a configuration. The movable rear plate 363 in the ninth embodiment is removed in the tenth embodiment.

FIG. 32 is a perspective view showing the cargo bed in the rearward expanded state. In FIG. 32, the third side plate rotary support mechanism 440 is provided with a vertical shaft 441. The third side plate rotary support mechanism 440 is formed by a hinge including the vertical shaft 441, for example. The hinge including the vertical shaft 441 pivotably connects the movable sideplate 162D and the movable rear plate 163. The third side plate rotary support mechanism 440 supports the movable side plate 162D pivotably on the vertical shaft 441 relative to the movable bottom plate 161 integrated with the movable rear plate 163.

In FIG. 31 (the normal state), the movable bottom plate 161 and the movable rear plate 163 are at the first normal position PN1, and the movable side plate 162D is at the second normal position PN2. The movable side plate 162D at the second normal position PN2 is closed down to the movable rear plate 163. In such a way, the cargo bed CN in the normal state is formed.

In FIG. 32 (the rearward expanded state), the movable bottom plate 161 and the movable rear plate 163 are at the first expansion position, and the movable side plate 162D is at the second expansion position PE2. The movable side plate 162D at the second expansion position PE2 is opened relative to the movable rear plate 163. At this time, a front face of the movable side plate 162D (FIG. 32) can be in contact with a rear face of the stationary sideplate 142. In such a way, the cargo bed CE in the rearward expanded state is formed.

FIG. 33 is a perspective view showing the cargo bed in the forward expanded state. In the tenth embodiment, the cargo bed is also expandable forward as well as the eighth and ninth embodiments. FIG. 33 of the tenth embodiment corresponds to FIG. 27 of the eighth embodiment.

Other Embodiment

The present invention is not limited to the structures of the embodiments above but includes various modifications not departing from a scope of the claims.

Next, examples of the pick-up style utility vehicle 1 provided with the expandable cargo bed will be described.

FIRST EXAMPLE

Figure 34:
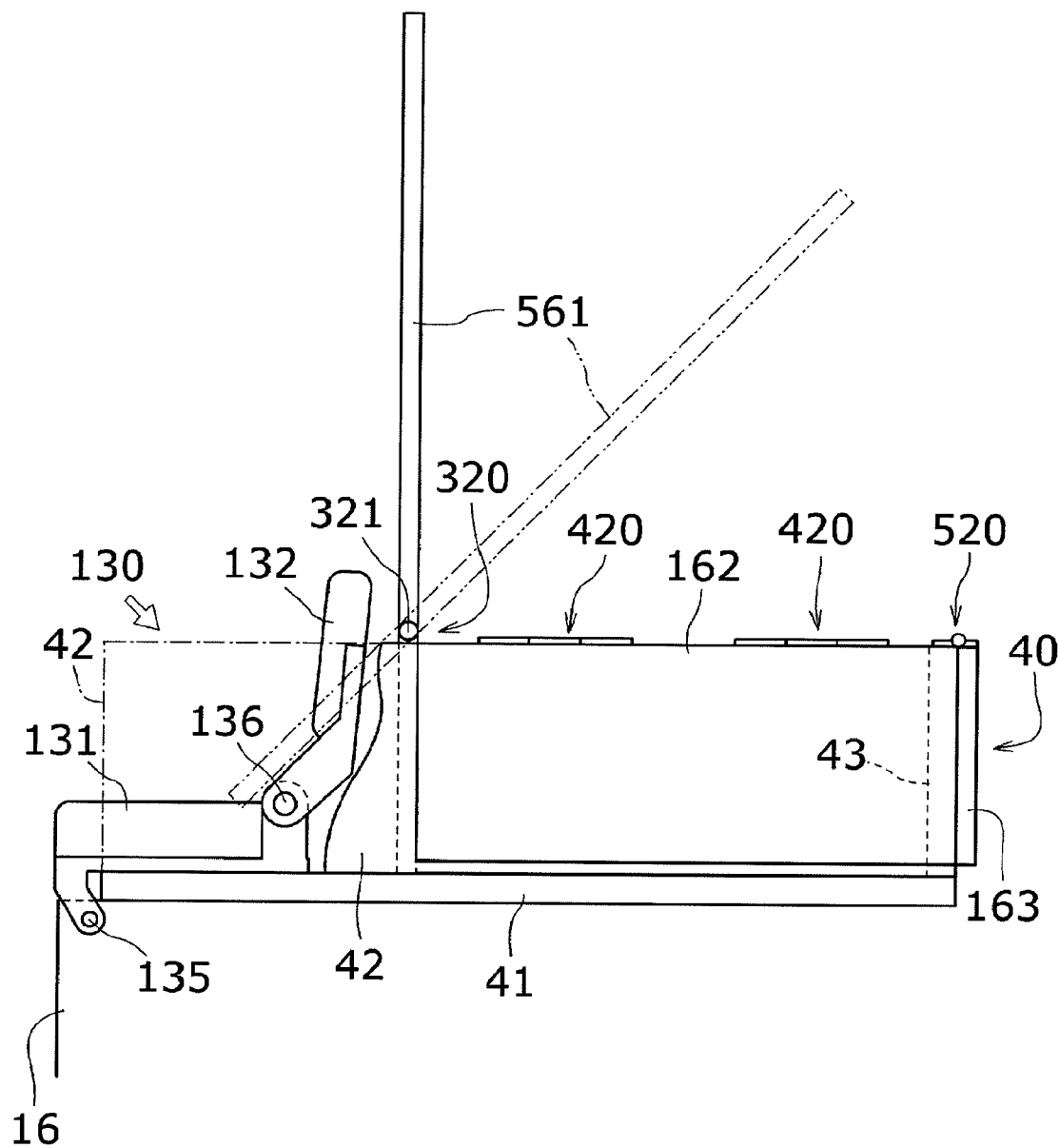
FIG. 34 is a side view showing the rear part of the pick-up style utility vehicle in the normal state (a first example)
Figure 35:
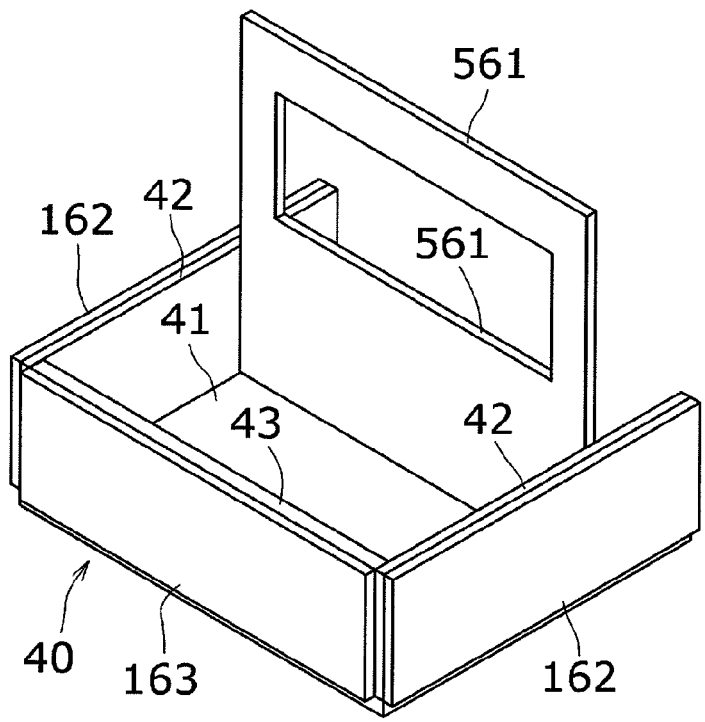
FIG. 35 is a perspective view showing the cargo bed in the normal state (the first example)
Figure 36:
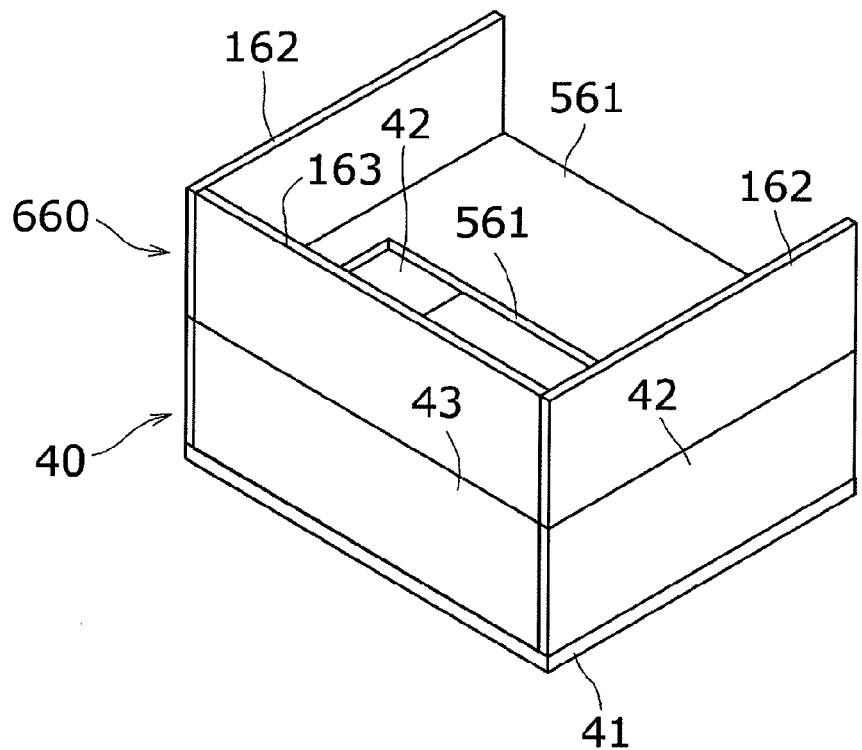
FIG. 36 is a perspective view showing the cargo bed in the expanded state (the first example)

FIGS. 34 to 36 show the pick-up style utility vehicle 1 in a first example. The first example is the same as the eighth embodiment except a difference in the configurations relating to the cargo bed. In the first example, parts which are common to the first and eighth embodiments will be given the same reference numerals. It should be noted that description of positional relationships in the first example is based on the posture in the normal state (FIG. 34).

FIG. 34 is a side view showing the rear part of the pick-up style utility vehicle 1 in the normal state. FIG. 35 is a perspective view showing the cargo bed in the normal state. FIG. 36 is a perspective view showing the cargo bed in the expanded state.

The cargo bed in the first example is expandable upward and forward. Therefore, the movable rear seat 130 is provided in the first example as well as the eighth embodiment.

In FIGS. 34 and 35, the stationary cargo bed part 40, a movable bottom plate 561, a second bottom plate rotary support mechanism 320, the two movable side plates 162, 162, the second sideplate rotary support mechanisms 420, the movable rear plate 163, and a second rear plate rotary support mechanism 520 are provided in the first example as the configurations relating to the cargo bed.

The stationary cargo bed part 40 is provided with the bottom plate 41, the two side plates 42, 42 and the rear plate 43 as described in the first embodiment.

The second bottom plate rotary support mechanism 320 supports the movable bottom plate 561 pivotably on a horizontal shaft 321 in the right and left direction relative to an upper end of the side plate 42. Here, a position of the horizontal shaft 321 in the back and forth direction is set in consideration with use of the movable bottom plate 561. Specifically, the position of the horizontal shaft 321 is set so that a rear end of the movable bottom plate 561 corresponds to a rear end of the side plate 42 when the movable bottom plate 561 is brought down rearward (when the movable bottom plate 561 functions as the bottom face).

The second side plate rotary support mechanisms 420 support the movable side plate 162 pivotably on a horizontal shaft in the back and forth direction relative to the upper end of the side plate 42.

The second rear plate rotary support mechanism 520 supports the movable rear plate 163 pivotably on a horizontal shaft in the right and left direction relative to an upper end of the rear plate 43. The second rear plate rotary support mechanism 520 is formed by a hinge, for example.

In FIG. 35, the movable bottom plate 561 is vertical to the bottom plate 41. The movable side plates 162 are in contact with outer faces of the side plates 42 in the right and left direction, and the movable rear plate 163 is in contact with a rear face of the rear plate 43. At this time, the cargo bed CN in the normal state is formed.

When the cargo bed is changed from the normal state to the expanded state, the rear seat 130 is preliminarily shunted to the front side.

As shown in FIG. 36, an expansion cargo bed part 660 which is a separate body from the stationary cargo bed part 40 can be formed on the upper side of the stationary cargo bed part 40 in the first example. The expansion cargo bed part 660 includes the movable bottom plate 561, the two movable side plates 162, 162, and the movable rear plate 163. In FIG. 36, the movable bottom plate 561 is parallel to the bottom plate 41. The movable side plates 162 are disposed on the side plates 42, and the movable rear plate 163 is disposed on the rear plate 43. Here, the movable bottom plate 561 serves as a bottom face of the expansion cargo bed part 660. The two movable side plates 162, 162 serve as side faces of the expansion cargo bed part 660 in the right and left direction. The movable rear plate 163 serves as a rear face of the expansion cargo bed part 660. At this time, the cargo bed CE in the expanded state is formed.

The movable bottom plate 561 can be utilized as a screen for closing the front side of the stationary cargo bed part 40 or the bottom face of the expansion cargo bed part 660 to be arranged on the upper side of the stationary cargo bed part 40. In FIGS. 34 and 35, the movable bottom plate 561 functions as the screen. In FIG. 36, the movable bottom plate 561 functions as the bottom face of the expansion cargo bed part 660. An opening part 561a is formed in an upper part of the movable bottom plate 561.

The cargo bed CE in the expanded state is expanded forward and upward more than the cargo bed CN in the normal state. The forward-expanded part is a part in the stationary cargo bed part 40 from the horizontal shaft 321 to a lower end of the movable bottom plate 561 (a front end in FIG. 36). The upward-expanded part is the expansion cargo bed part 660.

In the cargo bed CE, an upper face of the stationary cargo bed part 40 is covered by the movable bottom plate 561.

However, the passengers can access the interior of the stationary cargo bed part 40 via the opening part 561*a*.

SECOND EXAMPLE

Figure 37:
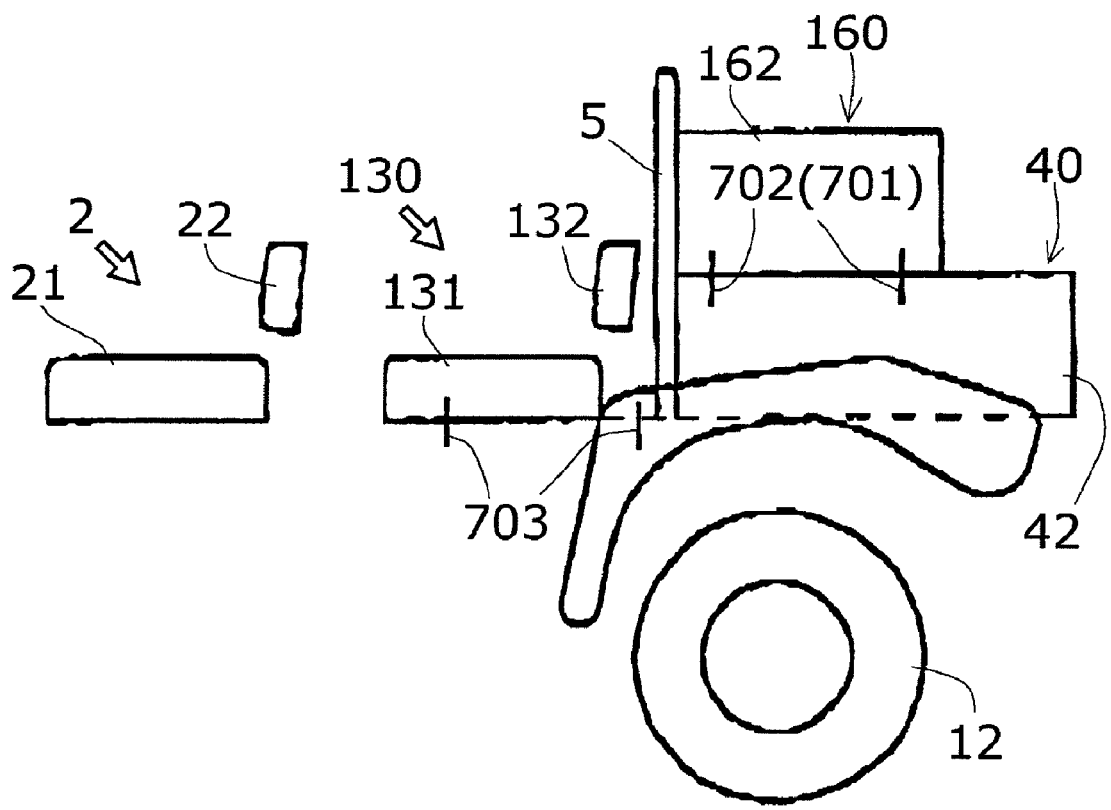
FIG. 37 is a side view showing the cargo bed in the normal state (a second example)
Figure 38:
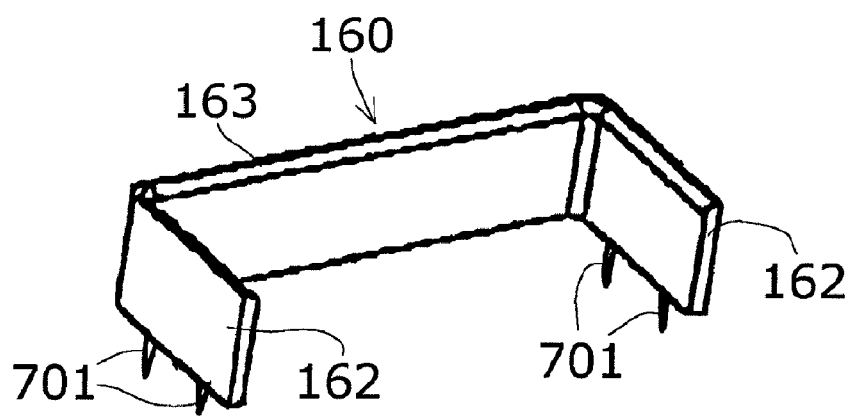
FIG. 38 is a perspective view showing a movable plate part (the second example)
Figure 39:
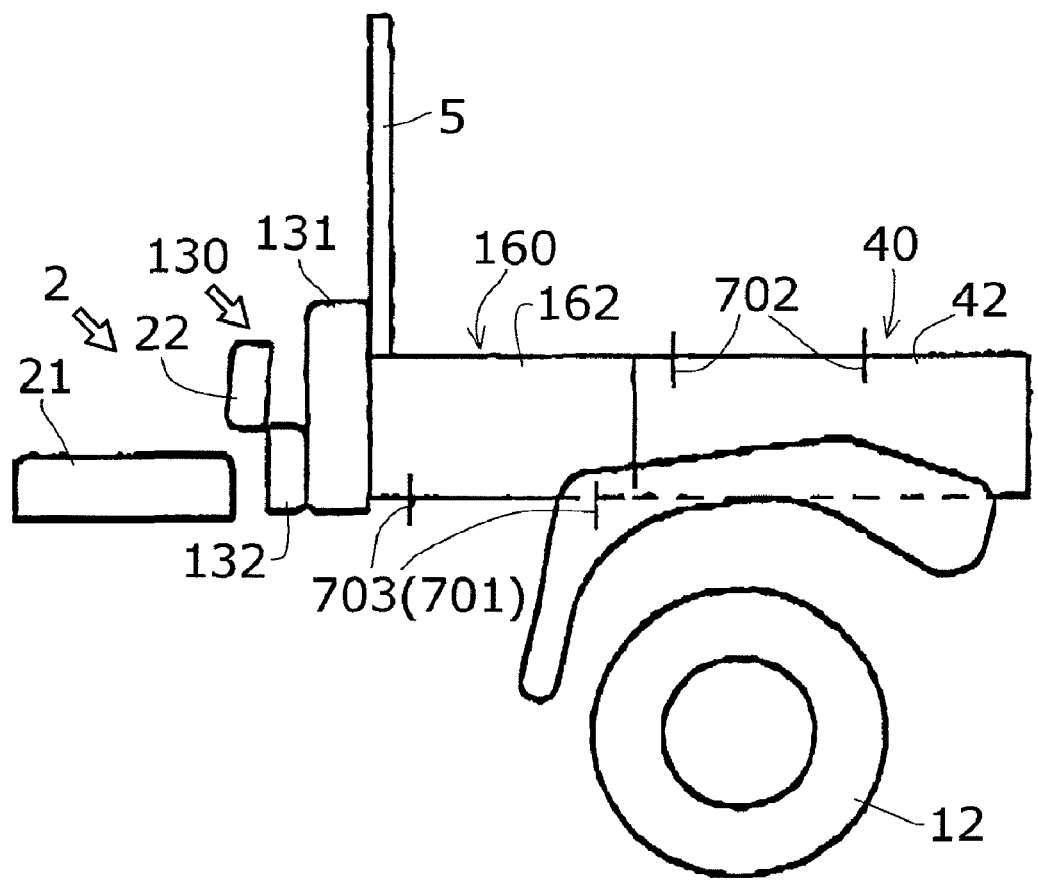
FIG. 39 is a side view showing the cargo bed in the forward expanded state (the second example)

FIGS. 37 to 39 show the pick-up style utility vehicle 1 in a second example. The second example is the same as the eighth embodiment except a difference in the configurations relating to the cargo bed. In the second example, parts which are common to the first and eighth embodiments will be given the same reference numerals. It should be noted that description of positional relationships in the second example is based on the posture in the normal state (FIG. 37).

FIG. 37 is a side view showing the cargo bed CN in the normal state. The screen 5, the stationary cargo bed part 40, the movable plate part 160, and a side plate support mechanism are provided in the second example as the configurations relating to the cargo bed.

FIG. 38 is a perspective view showing the movable plate part 160. The movable plate part 160 is a part for expanding the cargo bed. The movable plate part 160 is formed by the two movable side plates 162, 162, and the movable rear plate 163. The movable plate part 160 is provided with pins 701. Two sets of the pins 701, 701 respectively project to the lower side of the movable side plates 162 on the right and left sides.

In FIG. 37, the side plate support mechanism is formed by the pins 701 provided in the movable plate part 160, and engagement holes 702, 703 provided in the stationary cargo bed part 40. The pins 701 are engageable with the engagement holes 702, 703. The two engagement holes 702, 702 are formed in the upper end of the side plate 42 of the stationary cargo bed part 40. The other two engagement holes 703, 703 are formed in a front part of the bottom plate 41.

In FIG. 37 (the normal state), the movable plate part 160 is arranged on the upper side of the stationary cargo bed part 40, and the screen 5 closes the front side of the stationary cargo bed part 40. The pins 701 are engaged with the engagement holes 702 of the side plate 42, so that the movable plate part 160 is supported on the stationary cargo bed part 40. In such a way, the cargo bed CN in the normal state is formed.

FIG. 39 is a side view showing the cargo bed in the forward expanded state. In FIG. 39, the rear seat 130 is shunted to the front side, and the movable plate part 160 is arranged on the front side of the stationary cargo bed part 40. The screen 5 is arranged on the upper side of a front end of the movable plate part 160. The pins 701 are engaged with the engagement holes 703 of the bottom plate 41, so that the movable plate part 160 is supported on the bottom plate 41. In such a way, the cargo bed CE in the forward expanded state is formed.

The two movable side plates 162, 162 and the movable rear plate 163 may be formed independently from each other instead of integrated as in the movable plate part 160. In this case, the two movable side plates 162, 162 and the movable rear plate 163 are respectively detachable from the stationary cargo bed part 40 and the bottom plate 41.

THIRD EXAMPLE

Figure 40:
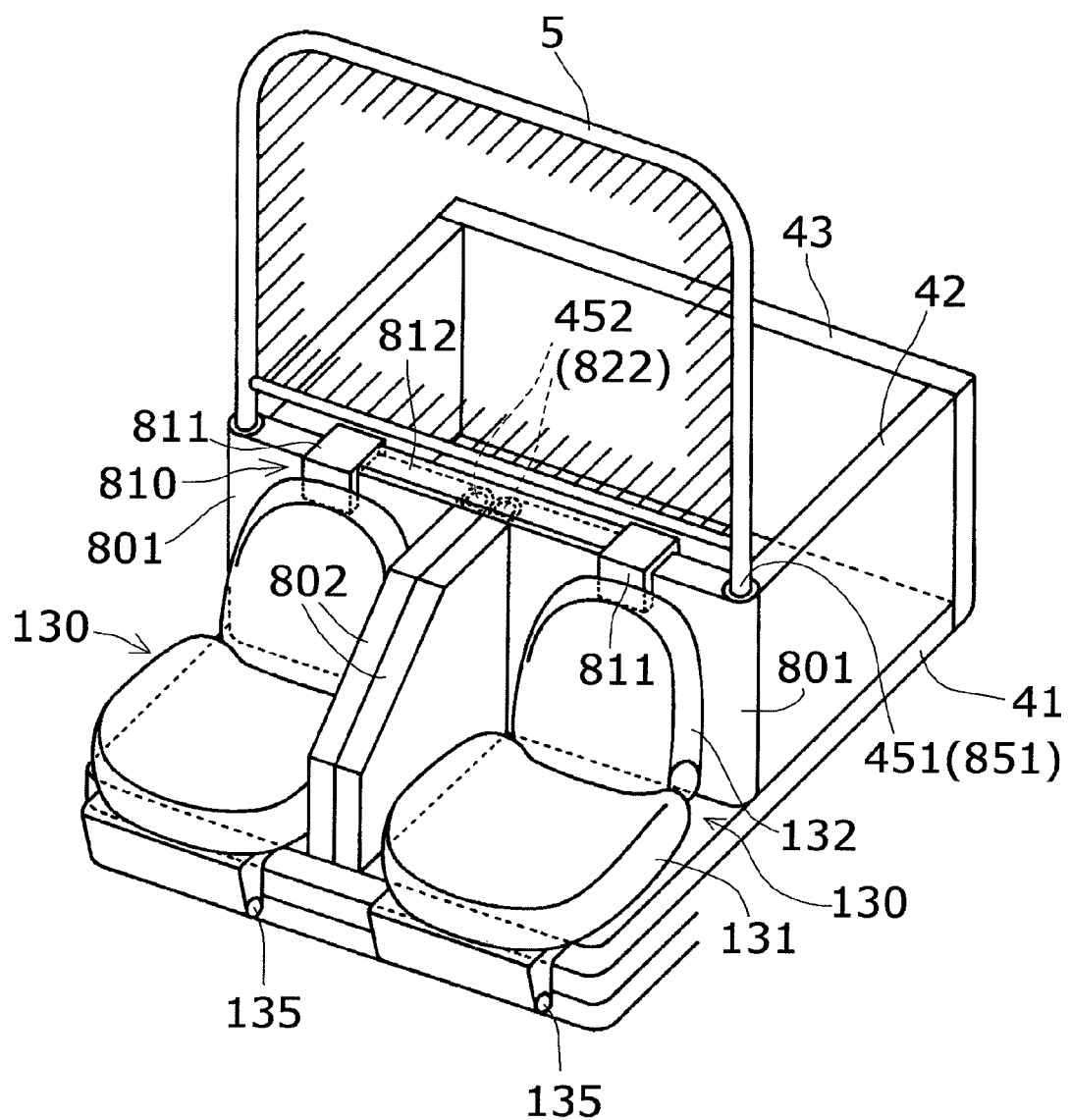
FIG. 40 is a side view showing the cargo bed in the normal state (a third example)
Figure 41:
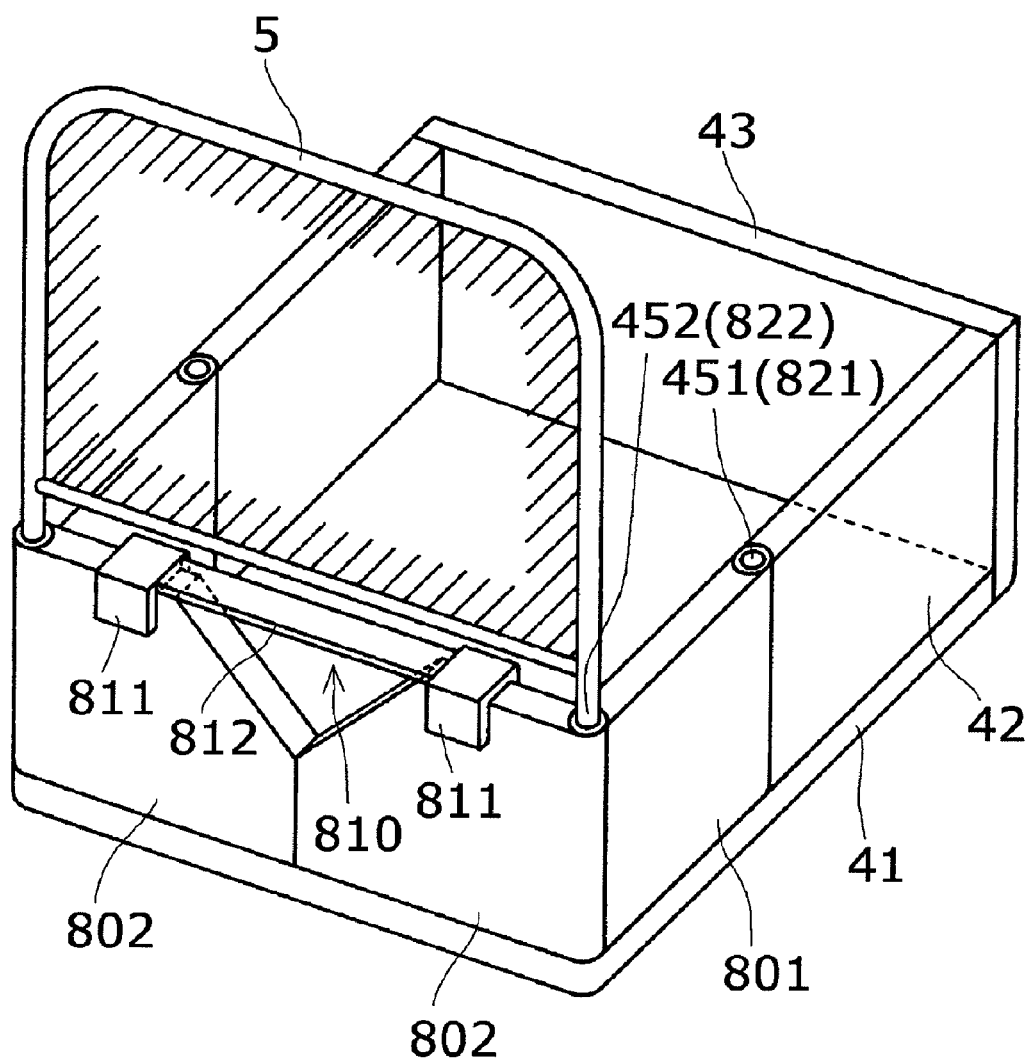
FIG. 41 is a side view showing the cargo bed in the forward expanded state (the third example)
Figure 42:
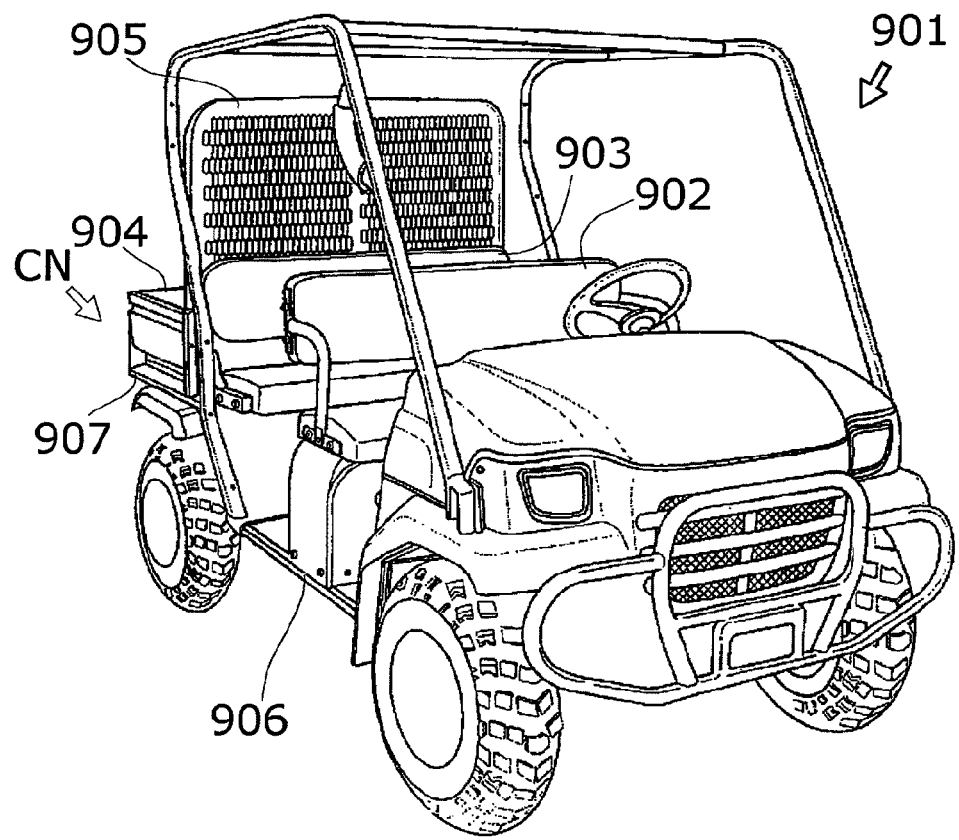
FIG. 42 is a perspective view showing a pick-up style utility vehicle (the related art)
Figure 43:
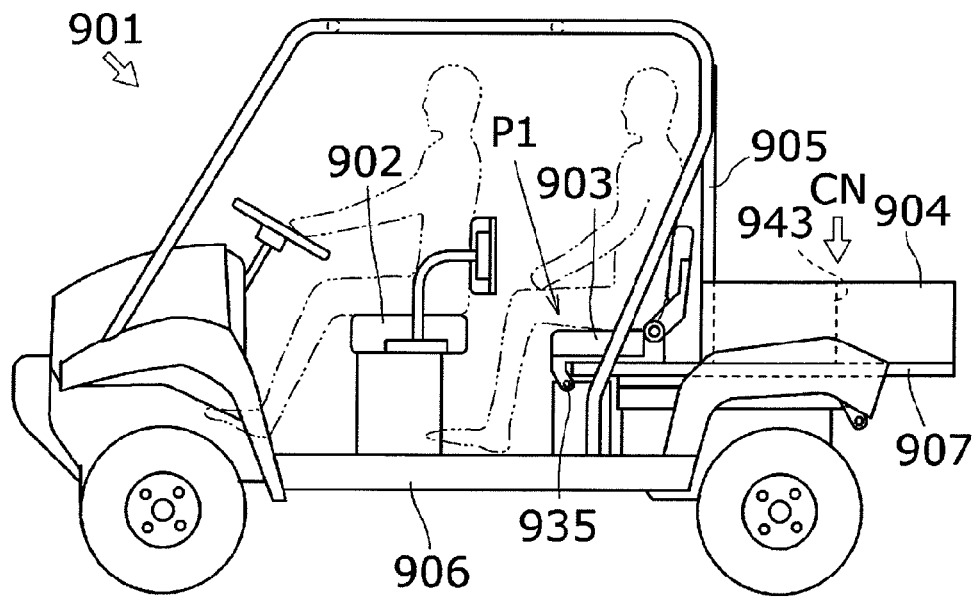
FIG. 43 is a side view showing the pick-up style utility vehicle in the normal state (the related art)
Figure 44:
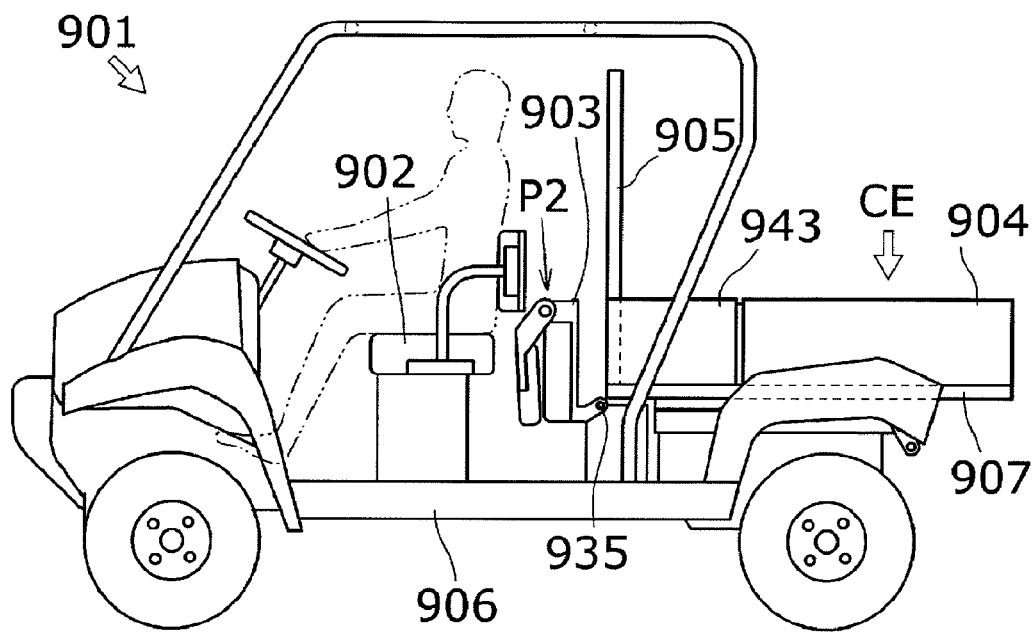
FIG. 44 is a side view showing the pick-up style utility vehicle in the expanded state (the related art)
Figure 45:
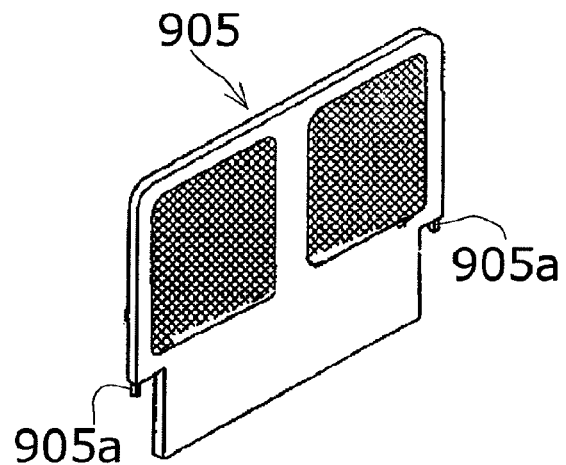
FIG. 45 is a perspective view showing a screen (the related art).

FIGS. 40 and 41 show the pick-up style utility vehicle 1 in a third example. The third example is the same as the eighth embodiment except a difference in the configurations relating to the cargo bed. In the third example, parts which are common to the first and eighth embodiments will be given the same reference numerals. It should be noted that description of positional relationships in the third example is based on the posture in the normal state (FIG. 40).

FIG. 40 is a side view showing the cargo bed CN in the normal state. FIG. 41 is a side view showing the cargo bed CE in the forward expanded state.

In FIGS. 40 and 41, the stationary cargo bed part 40, movable side plates 801, 802, a fifth sideplate rotary support mechanism, and a fixing member 810 are provided in a third example as the configurations relating to the cargo bed.

In FIG. 40, the two one-seater rear seats 130 are provided in the third example. The rear seats 130 are pivotable on the horizontal shafts 135.

In FIG. 40, the fifth side plate rotary support mechanism is provided with two sets of vertical shafts 451, 452. The fifth side plate rotary support mechanism is formed by hinges, for example. The hinges including the first vertical shafts 451 pivotably connect the side plates 42 and the movable side plates 801. The hinges including the second vertical shafts 452 pivotably connect the movable side plates 801 and the movable side plates 802.

The fixing member 810 includes two U shape members 811, 811, and a plate shape connection part 812 for connecting the two U shape members 811, 811. Opening width of the U shape members 811 is substantially the same as thickness of the movable side plates 801, 802.

The screen 5 can be attached to connection parts 821 between the side plates 42 and the movable side plates 801, and connection parts 822 between the movable side plates 801 and the movable side plates 802.

In FIG. 40 (the normal state), the movable side plates 801 are placed on the rear side of the rear seats 130, and the movable side plates 802 are placed between the right and left rear seats 130, 130. The two movable side plates 801, 801 are aligned in line along the right and left direction. Therefore, the two movable side plates 801, 801 close the front side of the stationary cargo bed part 40. The screen 5 is attached to the right and left connection parts 821, 821. In such a way, the cargo bed CN in the normal state is formed.

In FIG. 40, the fixing member 810 is attached to the two movable side plates 801, 801. Therefore, positions of the two movable side plates 801, 801 are held.

When the cargo bed is changed from the normal state to the expanded state, the passengers preliminarily shunt the rear seats 130 to the front side.

In FIG. 41 (the forward expanded state), the movable side plates 801 are respectively aligned in line with the side plates 42 in the back and forth direction. The two movable side plates 802, 802 are aligned in line in the right and left direction. Therefore, the two movable side plates 802, 802 close the front side of the stationary cargo bed part 40. The screen 5 is attached to the right and left connection parts 822, 822. In such a way, the cargo bed CE in the forward expanded state is formed.

In FIG. 41, the fixing member 810 is attached to the two movable side plates 802, 802. Therefore, positions of the two movable side plates 802, 802 are held.

What is claimed is:

1. A pick-up style utility vehicle with an expandable cargo bed, comprising:
    a stationary cargo bed part serving as a bottom face and a side face of the cargo bed;
    a movable cargo bed part serving as the bottom face and the side face of the expanded cargo bed; and
    a linkage mechanism for guiding movement of the movable cargo bed part between a normal position and an expansion position set on a rear side of the normal position,
    wherein the linkage mechanism is provided with a link, a stationary shaft rotatably connecting one end of the link to a central part of a side plate of the stationary cargo bed part, and a movable shaft rotatably connecting the other end of the link to a front part of a side plate of the movable cargo bed part.

2. The pick-up style utility vehicle according to claim 1, wherein the movable cargo bed part, at the normal position, is positioned immediately above the stationary cargo bed part, and the movable cargo bed part at the expansion position is positioned immediately behind the stationary cargo bed part.

3. The pick-up style utility vehicle according to claim 1, wherein the stationary cargo bed part includes a bottom plate and a rear plate pivotally attached via a horizontal shaft on a rear end of the bottom plate, wherein, when the movable cargo bed part is moved to the expansion position, the rear plate of the stationary cargo bed part can be pivoted rearwardly to form part of the cargo bed.

* * * * *